(12) United States Patent
Nguyen et al.

(10) Patent No.: US 12,061,648 B2
(45) Date of Patent: *Aug. 13, 2024

(54) REMOTE VIRTUALIZED ASSET DELIVERY AND LOCAL PROVISIONING

(71) Applicant: Numecent Holdings, Inc., Irvine, CA (US)

(72) Inventors: Huy Nguyen, Irvine, CA (US); Robert Tran, Anaheim, CA (US); Brian Maxson, Riverside, CA (US); Arthur S. Hitomi, Huntington Beach, CA (US)

(73) Assignee: Numecent Holdings, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,736

(22) Filed: Jan. 4, 2023

(65) Prior Publication Data

US 2023/0144263 A1 May 11, 2023

Related U.S. Application Data

(63) Continuation of application No. 16/861,072, filed on Apr. 28, 2020, now Pat. No. 11,586,672, which is a (Continued)

(51) Int. Cl.
*G06F 7/00* (2006.01)
*A63F 13/70* (2014.01)
(Continued)

(52) U.S. Cl.
CPC .............. *G06F 16/84* (2019.01); *A63F 13/70* (2014.09); *G06F 9/44521* (2013.01);
(Continued)

(58) Field of Classification Search
CPC .... G06F 16/84; G06F 16/168; G06F 9/44521; G06F 21/606; G06F 16/00;
(Continued)

(56) References Cited

U.S. PATENT DOCUMENTS

2013/0318211 A1   11/2013   Kent et al.
2013/0339595 A1   12/2013   Kumar et al.
(Continued)

OTHER PUBLICATIONS

International Application No. PCT/US2017/031814, International Search Report and Written Opinion dated Jul. 6, 2017.

*Primary Examiner* — Md I Uddin
(74) *Attorney, Agent, or Firm* — Ahmann Kloke LLP

(57) ABSTRACT

Interaction output over a local computer-readable medium (CRM) generated based on user interaction with rendered content input representing a virtualized asset being is received at a virtualized asset local provisioning server. A manner to exploit the virtualized asset is determined from interaction output. The virtualized asset is exploited based on the determined manner to exploit the virtualized asset. A request for a portion of the virtualized asset generated in response to the exploiting the virtualized asset is intercepted. If it is determined that the portion of the virtualized asset is absent from the local storage, a request for the portion of the virtualized asset is sent to a virtualized asset delivery system over a non-local CRM; the portion of the virtualized asset retrieved by the virtualized asset delivery system is received over the non-local CRM; and the received portion of the virtualized asset is used in exploiting the virtualized asset.

16 Claims, 15 Drawing Sheets

Related U.S. Application Data continuation of application No. 15/590,760, filed on May 9, 2017, now Pat. No. 10,635,715.

(60) Provisional application No. 62/337,853, filed on May 17, 2016, provisional application No. 62/333,381, filed on May 9, 2016.

(51) Int. Cl.
| | |
|---|---|
| *G06F 9/445* | (2018.01) |
| *G06F 16/16* | (2019.01) |
| *G06F 16/84* | (2019.01) |
| *G06F 21/60* | (2013.01) |
| *H04L 9/40* | (2022.01) |
| *H04L 65/61* | (2022.01) |
| *H04L 67/131* | (2022.01) |
| *H04N 21/232* | (2011.01) |
| *G06F 9/455* | (2018.01) |
| *G06F 16/00* | (2019.01) |

(52) U.S. Cl.
CPC .......... *G06F 16/168* (2019.01); *G06F 21/606* (2013.01); *H04L 63/0272* (2013.01); *H04L 65/61* (2022.05); *H04L 67/131* (2022.05); *H04N 21/2323* (2013.01); *G06F 2009/45579* (2013.01); *G06F 2009/45595* (2013.01); *G06F 16/00* (2019.01); *H04L 9/40* (2022.05); *H04L 63/10* (2013.01)

(58) Field of Classification Search
CPC . G06F 2009/45579; G06F 2009/45595; H04L 67/131; H04L 65/61; H04L 63/0272; H04L 9/40; H04L 63/10; H04N 21/2323; A63F 13/70
USPC ........ 707/722, 729, 736, 694, 737, 776, 831
See application file for complete search history.

(56) References Cited

U.S. PATENT DOCUMENTS

| | | |
|---|---|---|
| 2014/0136601 A1 | 5/2014 | Kent et al. |
| 2014/0207963 A1* | 7/2014 | Kent .................... H04L 65/612 709/231 |
| 2015/0143351 A1 | 5/2015 | Vries et al. |

* cited by examiner

REMOTE VIRTUALIZED ASSET DELIVERY AND LOCAL PROVISIONING

CROSS-REFERENCE TO RELATED APPLICATIONS

This application is a continuation of U.S. patent application Ser. No. 16/861,072 filed Apr. 28, 2020 and entitled "Remote Virtualized Asset Delivery and Local Provisioning," which is a continuation of U.S. patent application Ser. No. 15/590,760 filed May 9, 2017 and entitled "Remote Virtualized Asset Delivery and Local Provisioning," now U.S. Pat. No. 10,635,715, which claims the benefit of U.S. Provisional Patent Application Ser. No. 62/337,853 filed May 17, 2016 and entitled "Cloud Paging File System," and U.S. Provisional Patent Application Ser. No. 62/333,381 filed May 9, 2016 and entitled "Remote Virtualized Asset Delivery and Local Provisioning," all of which are incorporated by reference herein

BACKGROUND

An area of ongoing research and development is the virtualization of assets. In particular, there exists the need to virtualize assets remotely from content clients in order to reduce the amount of memory that content clients need to correctly operate and improve the scalability and processing power of networks having content clients.

The foregoing examples of the related art and limitations related therewith are intended to be illustrative and not exclusive. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Interaction output over a local computer-readable medium (CRM) generated based on user interaction with rendered content input representing a virtualized asset being exploited corresponding to an asset virtualized remotely from a content client is received at a virtualized asset local provisioning server. A manner to exploit the virtualized asset is determined from the interaction output. The virtualized asset is exploited based on the determined manner to exploit the virtualized asset. A request for a portion of the virtualized asset generated in response to the exploiting the virtualized asset is intercepted. It is determined whether the portion of the virtualized asset resides in local storage at the virtualized asset local provisioning server. If it is determined that the portion of the virtualized asset is absent from the local storage, a request for the portion of the virtualized asset is sent to a virtualized asset delivery system over a non-local CRM; the portion of the virtualized asset retrieved by the virtualized asset delivery system is received over the non-local CRM; and the received portion of the virtualized asset is used in exploiting the virtualized as set.

These and other advantages will become apparent to those skilled in the relevant art upon a reading of the following descriptions and a study of the several examples of the drawings.

DETAILED DESCRIPTION

Figure 1:
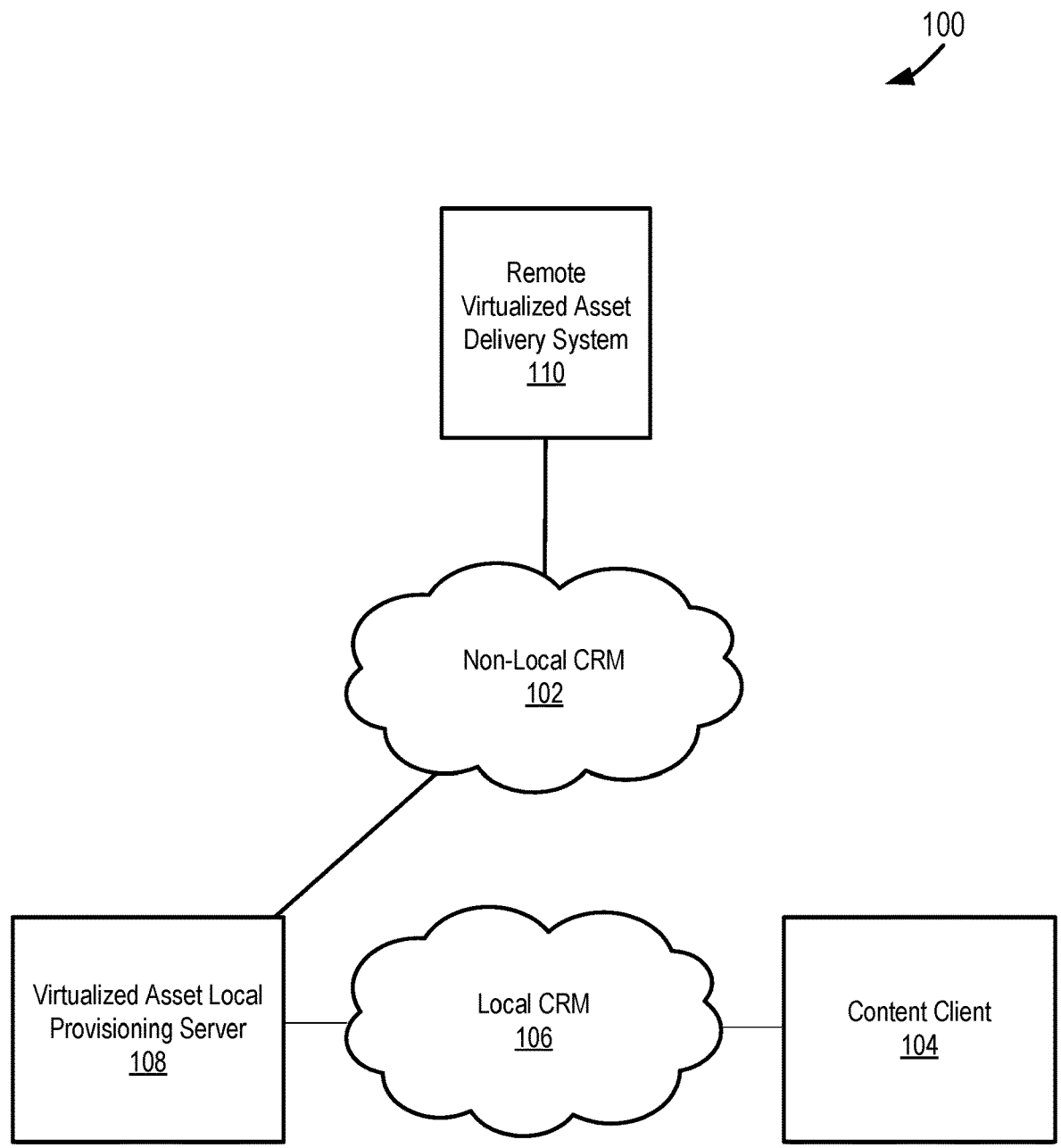
FIG. 1 depicts a diagram 100 of a system for virtualizing assets at a server remote from a content client.

FIG. 1 depicts a diagram 100 of a system for virtualizing assets at a server remote from a content client. The example system shown in FIG. 1 includes a non-local computer-readable medium (CRM) 102, a content client 104, a local CRM 106, a virtualized asset local provisioning server 108, and a remote virtualized asset delivery system 110.

In the example system shown in FIG. 1, the virtualized asset local provisioning server 108 and the remote virtualized asset delivery system 110 are coupled to each other through the non-local CRM 102. A "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. A computer-readable medium is intended to represent a variety of potentially applicable technologies. For example, a computer-readable medium can include a bus or be used to form a network or part of a network.

In a specific implementation, the non-local CRM 102 includes a networked system that includes several computer systems coupled together, such as a campus area network (CAN), municipal area network (MAN), or wide area network (WAN). In an alternative implementation where the non-local CRM 102 is a "relatively" non-local CRM, the non-local CRM 102 can include a networked system that includes several computer systems coupled together, such as a local area network (LAN) or even a personal area network (PAN), with the understanding the non-local CRM 102 is larger. For example, if the non-local CRM 102 is a WAN, the local CRM can be a LAN, while if the relatively non-local CRM 102 is a LAN, the local CRM 102 can include a bus or a PAN.

The non-local CRM 102, the content client 104, the local CRM 106, the virtualized asset local provisioning server 108, the remote virtualized asset delivery system 110, and other applicable systems or devices described in this paper can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, Ethernet interface, satellite transmission interface (e.g. "direct PC"), or other interfaces for coupling a computer system to other computer systems. Interfaces enable computer systems and other devices to be coupled together in a network.

A computer system can be compatible with or implemented, at least in part, through a cloud-based computing system. As used in this paper, a cloud-based computing system is a system that provides virtualized computing resources, software and/or information to client devices. "Cloud" may be a marketing term and for the purposes of this paper can include any of the networks described herein.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or have its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some implementations, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

As used herein, an "asset" is data accessed or generated by a computer-based process. As way of example, an asset can include applications, such as games, document-based applications (e.g., word processing or spreadsheet applications), operating systems, image-related applications, video-related applications, etc., and data associated therewith. Where it is important to distinguish between serial data (such as videos), data can be referred to as non-sequential data and, similarly, the virtualized asset can be referred to as a branching virtual asset. Assets or portions of assets can reside at physical locations on datastores or systems that are remote from the content client 104. Assets or portions of assets can reside at physical locations on datastores or systems at the virtualized asset local provisioning server 108 and at the virtualized asset delivery system 110.

As understood herein, a "virtualized asset" is an asset that is at least partially broken into portions (e.g., blocks, chunks, pages, etc.), such that one or more of the portions of the asset can be exploited without requiring the entire asset to be available. Of particular significance are branching virtual assets because it is not possible to stream branching virtualized assets as one would stream a music video for which a first portion of the music video is part of an orderly sequence of non-branching portions from start to end. As used herein, "exploiting" a virtualized asset includes but is not limited to interacting with content of the virtualized asset or portion thereof, continuing to stream the virtualized asset or portion thereof, beginning to stream the virtualized asset or portion thereof, continuing to execute an application of or associated with the virtualized asset or portion thereof, and beginning to execute an application of or associated with the virtualized asset or portion thereof. In a specific implementation, a virtualized asset can be stored as compressed data in order to reduce the amount of bandwidth that is required to provide assets or portions of assets. In another specific implementation a virtualized asset can be stored as compressed data in order to reduce the processing power needed to execute the virtualized asset. In another specific implementation, a virtualized asset can also be stored as encrypted data.

In the example system shown in FIG. 1, the content client 104 and the virtualized asset local provisioning server 108 are coupled to each other through the local CRM 106. The content client 104 functions to send and receive data through the local CRM 106 used in virtualizing an asset remote from the content client 104. The content client 104 generates and sends interaction output based on user interaction. Interaction output can be generated based on user interaction with rendered content input. As used herein, "content input," includes data representing a virtualized asset being exploited that can be rendered for user interaction at the content client 104, as if the asset resided at the content client 104 in its entirety, thereby allowing the asset to be virtualized remote from the content client 104.

In a specific implementation, the content client 104 is associated with a user or a group of users regardless of what device or system in which the content client 104 operates. The content client 104 can be accessed by each user associated with the content client through a security mechanism and/or via a graphical user interface (GUI). For example, a user can gain access to a content client with which they are associated via a GUI by logging in and using a password. As will be discussed in greater detail later, one or more instances of the content client 104 can reside on the virtualized asset local provisioning server 108.

The virtualized asset local provisioning server 108 functions to virtualize an asset remote from a content client. In virtualizing an asset, the virtualized asset local provisioning server determines a virtualized asset or portion thereof needed to exploit the virtualized asset, checks to see if the virtualized asset or portion thereof resides locally, requests and retrieves the virtualized asset or portion thereof from a remote location if absent locally, and exploits the virtualized asset using the virtualized asset or portion thereof.

In a specific implementation, the virtualized asset local provisioning server 108 provides content input to a content client. Depending upon implementation-specific or other considerations, the virtualized asset local provisioning server 108 can provide content input representing a virtualized asset exploited according to interaction output received from a content client. For example, if interaction output specifies to move a character to a certain point in a game, then the virtualized asset local provisioning server 108 can provide content input representing moving of the character to the certain point in the game according to the interaction output. Further depending upon implementation-specific or other considerations, the virtualized asset local provisioning server 108 can provide content input to a content client in the form of a buffered data stream. For example, the virtualized asset local provisioning server 108 can provide content input to a content client in a data stream that can be rendered at the content client to make it appear as if a virtualized asset corresponding to the content input is actually playing at the content client. Further in the example, the content input can include a few portions of the virtualized asset or lack any portions of the virtualized asset to decrease an amount of storage space required at the content client.

In a specific implementation, the virtualized asset local provisioning server 108 determines a manner to exploit a virtualized asset based on received interaction output corresponding to user interaction at a content client. For example, a user at a content client may select (e.g., mouse-click) a software application, and consequently the virtualized asset local provisioning server 108 can determine it needs to locate and begin provisioning a virtualized asset corresponding to the software application. In the preceding example, provisioning means sending buffered data to the content client, where it will be rendered for user consumption, executed in association with an application, or used to facilitate operations of the application. Depending upon implementation-specific or other considerations, a determined manner to exploit a virtualized asset can be based on factors apart from user interaction.

In a specific implementation, the virtualized asset local provisioning server 108 determines a manner to exploit a virtualized asset based on whether a portion of the virtualized asset resides locally at the virtualized asset local provisioning server 108. Depending upon implementation-specific or other considerations, if the virtualized asset local provisioning server 108 determines a portion of a virtualized asset resides remotely, then the virtualized asset local provisioning server 108 can send a request to a virtualized asset delivery system to retrieve the portion of the virtualized asset.

In a specific implementation, the virtualized asset local provisioning server 108 functions to create and maintain one or more instances of a content client. Instances of a content client can include state information of a content client. Instances of a content client can further include asset history information related to a content client. Instances of a content client can further include asset history information about characteristics of a content client or a user thereof. An instance of a content client can be unique to a user of the content client, or it can be common to a number of users.

In a specific implementation, the virtualized asset local provisioning server 108 functions to intercept a request for a portion of a virtualized asset generated in response to exploiting a virtualized asset. The virtualized asset local provisioning server intercepts a request for a portion of a virtualized asset to prevent the request from reaching the operating system at the virtualized asset local provisioning server. Advantageously, the operating system need not be made aware the portion of the asset is virtualized and not present locally.

The remote virtualized asset delivery system 110 functions to send and receive data used in virtualizing assets at locations remote from a content client. In various implementations, the virtualized asset delivery system 110 can retrieve virtualized assets or portions thereof based on requests from a virtualized asset local provisioning server. The remote virtualized asset delivery system 110 can then retrieve the assets or the portions of the assets based upon the request and send the assets or the portions of the assets to a virtualized asset local provisioning server. Additionally, the remote virtualized asset delivery system 110 can retrieve assets predicted to be needed by a virtualized asset local provisioning server. The prediction can be based upon historical data indicating exploitation of a first portion of a branching virtualized asset suggests exploitation of a second portion of a branching virtualized asset within a given period of time. The prediction can also be based upon historical data indicating exploitation of a first portion of a first virtualized asset suggests exploitation of a first portion of a second virtualized asset within a given period of time. Historical data can include data associated with a particular user; geographic, demographic, psychographic, or behavioristic models mapped to user types or application types; and/or the particular virtualized asset or similar assets.

In a specific implementation, the remote virtualized asset delivery system 110 functions to maintain and use a resource map for retrieving and providing virtualized assets to a virtualized asset local provisioning server. A resource map can include location information of available virtualized assets and portions of available virtualized assets. Location information can include physical addresses or uniform resource locators (hereinafter URLs) of virtualized assets and portions thereof and logical addresses of the virtualized assets and portions thereof. Physical addresses can represent physical locations on the remote virtualized asset delivery system 110. Location information can also include the directories or subdirectories in which a virtualized assets resides.

In a specific implementation, the remote virtualized asset delivery system 110 functions to maintain a virtual file map included as part of resource maps for providing portions of virtualized assets to a virtualized asset local provisioning server. A virtual file map can include a map identifying portions of a file that are needed to exploit a virtualized asset in specific manners. Depending upon implementation-specific or other considerations, a virtual file map can include a map to a result of executing a file or portions of a file. Further depending upon implementation-specific or other considerations, a virtual file map can include a mapping of specific manners in exploiting a virtualized asset to portions of a file of the virtualized asset for exploiting the virtualized asset according to the specific manners. For example, a virtual file map can include a map of moving a character in a game to a specific point in a level and the specific portions of a file needed for execution to move the character in the game to the specific point. In various implementations, the remote virtualized asset delivery system 110 can use a virtual file map to provide results of executing portions of a file or a file, or to provide portions of a file to a virtualized asset local provisioning server for purposes of virtualizing, at the virtualized asset local provisioning server, a file for use in exploiting a virtualized asset.

In a specific implementation, the remote virtualized asset delivery system 110 functions to maintain location information, as part of resource maps, in part like a translation lookaside buffer (hereinafter TLB). Specifically, a TLB can include a map of logical addresses of a virtualized asset or portions of virtualized asset and corresponding physical addresses of a virtualized asset or portions of a virtualized asset. A TLB can be searched by looking up a logical address of a virtualized asset or portions of a virtualized asset and returning a physical address of the virtualized asset or portion of virtualized asset if a match is found to the logical address. Additionally, if a physical address of a virtualized asset or a portion of a virtualized asset changes, a TLB can be updated, by the remote virtualized asset delivery system 110, to reflect the change in the physical address.

In a specific implementation, the remote virtualized asset delivery system 110 functions to create and maintain one or more server instances of a virtualized asset local provisioning server. The remote virtualized asset delivery system 110, based on information stored in a server instance, can retrieve virtualized assets and provide the virtualized assets to a virtualized asset local provisioning server. A server instance can include a history of requests to retrieve virtualized assets received at the remote virtualized asset delivery system 110. A server instance can include information about characteristics of a virtualized asset local provisioning server, such as its hardware and software capabilities. In various implementations, a characteristic of a virtualized asset local provisioning server can include what application is executing on a virtualized asset local provisioning server.

In various implementations, the remote virtualized asset delivery system 110 can predict a virtualized asset or portion thereof requested by a virtualized asset local provisioning server and provide the predicted virtualized asset or portion thereof. In various implementations, the remote virtualized asset delivery system 110 can predict based on information stored in a server instance. In various implementations, the remote virtualized asset delivery system 110 can predict based on a frequency of past requests for retrieval of a particular virtualized asset. In various implementations, the remote virtualized asset delivery system 110 can predict based on what application is running at a virtualized asset local provisioning server at any given time. In various implementations, the remote virtualized asset delivery system 110 can predict based on what virtualized assets are locally stored at a virtualized asset local provisioning server at any given time.

In an example of operation of the example system shown in FIG. 1, the virtualized asset local provisioning server 108 virtualizes an asset at a location remote from the content client 104. In the example of operation of the example system shown in FIG. 1, the virtualized asset local provisioning server 108 sends content input to the content client 104 representing a virtualized asset being exploited at the virtualized asset local provisioning server 108 through the local CRM 106. Further, in the example of operation of the example system shown in FIG. 1, the virtualized assets provisioning server 108 receives interaction output generated based on user interaction with rendered content input of the content input through the local CRM 106 from the content client 104. In the example of operation of the example system shown in FIG. 1, the virtualized asset local provisioning server 108 determines a manner to exploit the virtualized asset at the asset provisioning server 108 from the interaction output and continues exploiting the virtualized asset based on the determined manner to exploit the virtualized asset.

In the example of operation of the example system shown in FIG. 1, the virtualized asset local provisioning server 108 intercepts requests for a portion of the virtualized asset generated in response to the exploiting of the virtualized asset and determines if the portion of the virtualized asset resides at the asset provisioning server. Further, in the example of operation of the example system shown in FIG. 1, the virtualized asset local provisioning server 108 provides the portion of the virtualized asset if it is determined it is locally stored. In the example of operation of the example system shown in FIG. 1, the virtualized asset local provisioning server 108 sends a request for the portion of the asset to the remote virtualized asset delivery system 110 through the non-local CRM 102 and receives the portion of the virtualized asset in response to the request through the non-local CRM 102 from the remote virtualized asset delivery system 110. Further, in the example of operation of the example system shown in FIG. 1, the virtualized asset local provisioning server uses the portion of the virtualized asset received from the remote virtualized asset delivery system 110 through the non-local CRM 102 to exploit the virtualized asset according to the determined manner to exploit the virtualized asset.

Figure 2:
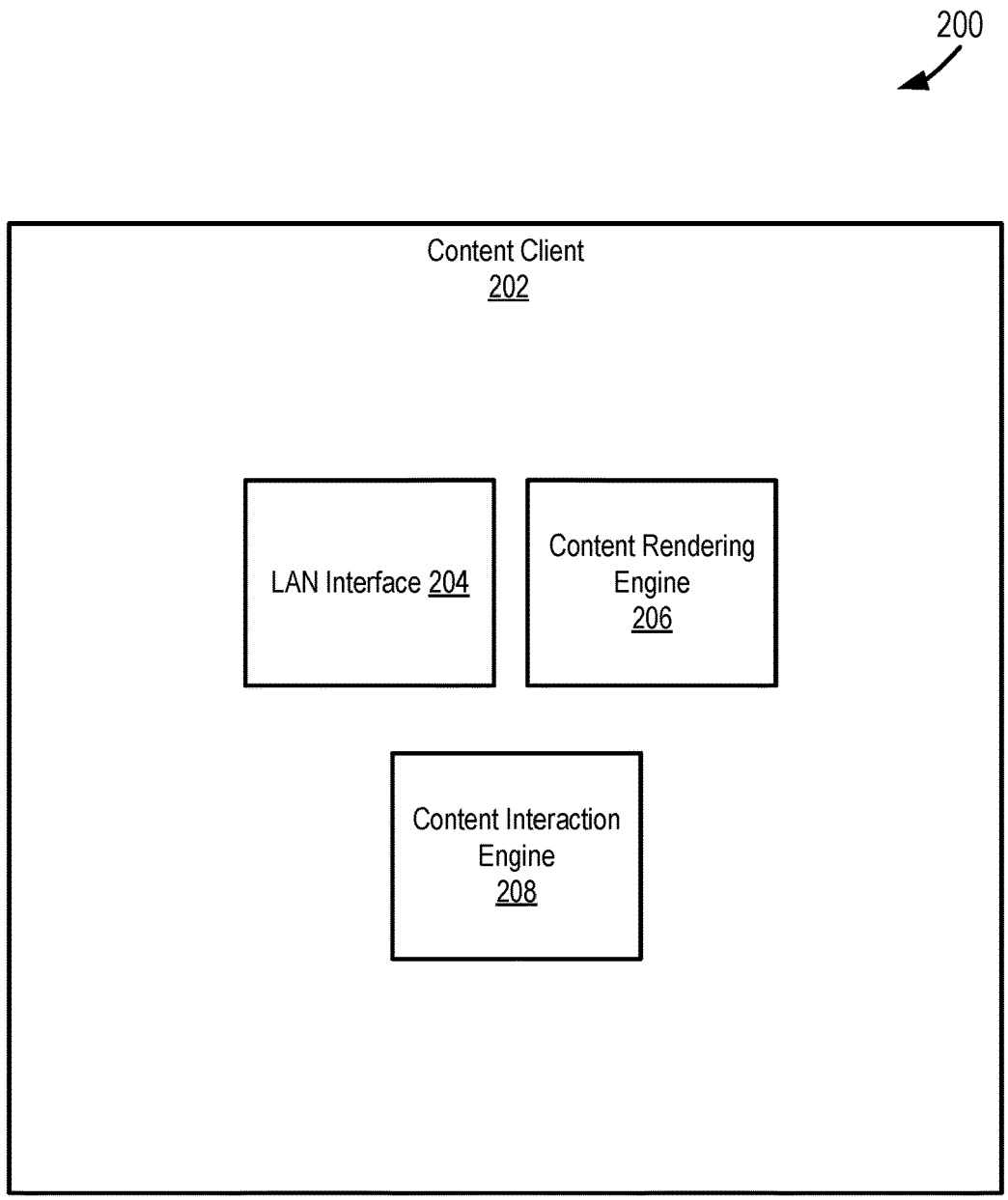
FIG. 2 depicts a diagram 200 of an example of a content client.

FIG. 2 depicts a diagram 200 of an example of a content client 202. The content client 202 functions according to an applicable device for supporting virtualizing assets at a server remote from the content client 202, such as at a virtualized asset local provisioning server as described in this paper. The content client 202 can be a mobile device. For example, the content client 202 can be a thin client or an ultra-thin client. In various implementations, content input can be data representing an executing virtualized asset. The content client 202 can include interfaces through which a user can interact with received content representing a virtualized asset being exploited, thereby generating interaction output a virtualized asset local provisioning server can use to exploit virtualized assets.

The content client 202 shown in FIG. 2 includes a LAN interface 204, a content rendering engine 206, and a content interaction engine 208. The LAN interface 204 functions to transmit interaction output generated based on user interaction with rendered content input and receive content input representing a virtualized asset being exploited. The LAN interface 204 can be implemented using one or more modules comprised of a simple buffer with input/output capabilities. Well-known examples of such modules are remote-desktop applications (e.g., Windows Remote Desktop, Chrome Remote Desktop, Real VNC, VNC Viewer, Tight VNC) and virtual private network (VPN) applications. It should be appreciated that while remote-desktop applications and VPN applications suffice to implement the functionality of the LAN interface 204, any module having a simple buffer with input/output capabilities can suffice. In an alternative the content client is coupled to a virtualized asset local provisioning system via a bus, which can replace the LAN interface 204, or via a PAN interface, which can replace the LAN interface 204.

The content rendering engine 206 functions to render received content input. Rendered content input represents a virtualized asset being exploited, and allows a user at a content client to interact with the virtualized asset being exploited. In various implementations, the content rendering engine 206 renders at a content client a representation of an application executing on a virtualized asset local provisioning server. In various other implementations, the content rendering engine 206 renders at a content client a representation of data provided from a virtualized asset local provisioning server, or content that can be ascertained thereby or in association therewith. For example, the content rendering engine 206 can render content input representing a movie clip streaming on a virtualized asset local provisioning server. It should be noted, however, executable content is not necessarily rendered for human consumption, and may include operations that occur with no resultant audio or visual artifacts.

The content interaction engine 208 functions to facilitate user interaction with rendered content input. Based on user interaction, interaction output is generated and sent to the LAN interface 204. Depending upon implementation-specific or other considerations, interaction output can include instructions indicating how to exploit a virtualized asset based on an executing virtualized asset. For example, interaction output can include instructions to move a character to a specific point on a map in a currently executing game. Further depending upon implementation-specific or other considerations, interaction output can include how a user at the content client 104 interacts with a virtualized asset.

In the example of operation of the example system shown in FIG. 2, the LAN interface 204 receives from a virtualized asset local provisioning server content input representing a virtualized asset being exploited. The content rendering engine 206 renders the content input to allow for user interaction. The content interaction engine 208 facilitates user interaction with the rendered content input, and sends the user interaction information to the LAN interface 204. The LAN interface sends the user interaction as output to the virtualized asset local provisioning server.

Figure 3:
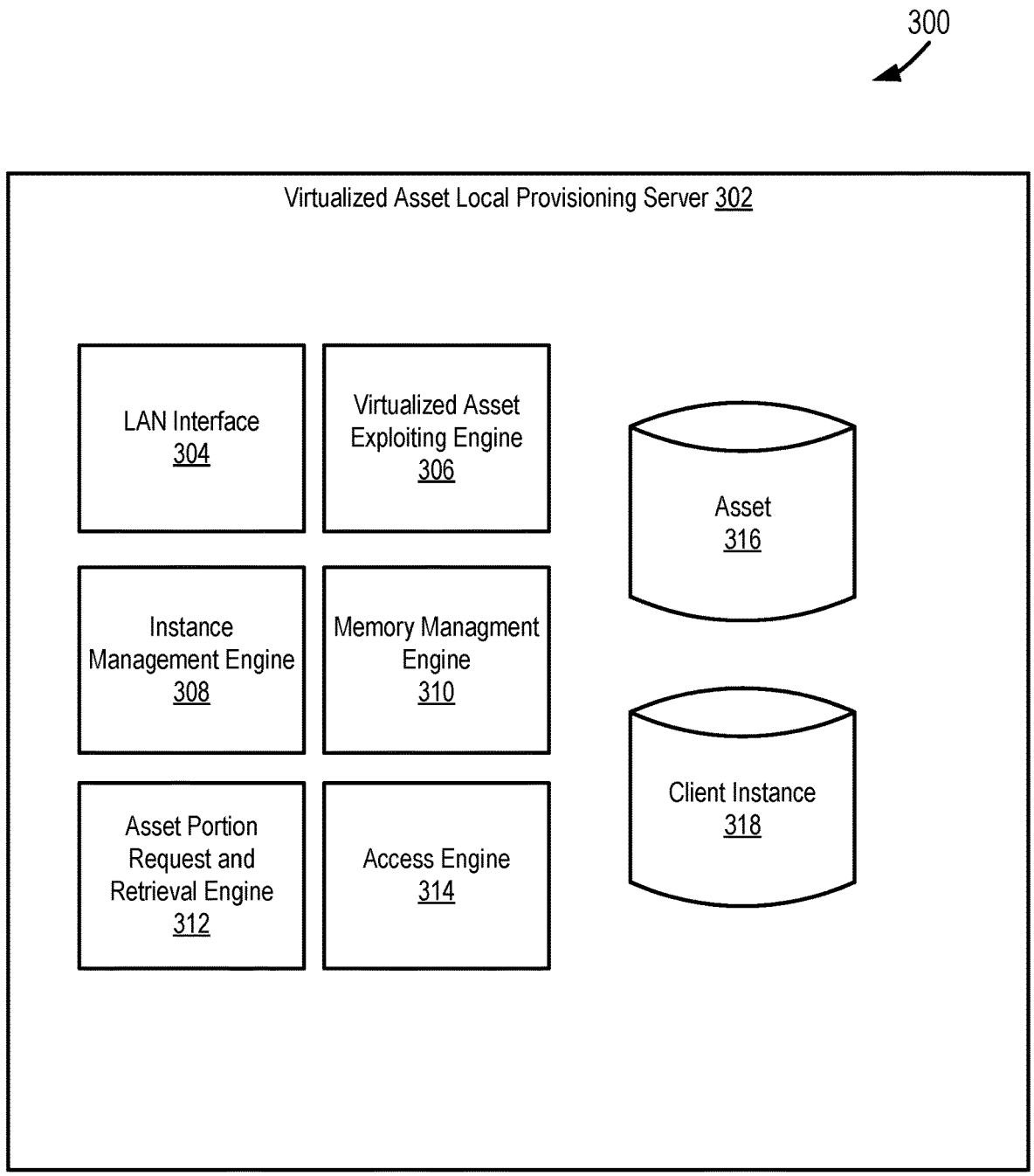
FIG. 3 depicts a diagram 300 of an example of a virtualized asset local provisioning server for virtualizing assets remote from a content client.

FIG. 3 depicts a diagram 300 of an example of a virtualized asset local provisioning server 302. The virtualized asset local provisioning server 302 functions according to an applicable system for virtualizing assets remote from a content client, such as systems described in this paper. The virtualized asset local provisioning server 302 shown in FIG. 3 includes a LAN interface 304, virtualized asset exploiting engine 306, instance management engine 308, memory management engine 310, asset portion request and retrieval engine 312, access engine 314, asset datastore 316, and client instance datastore 318. The LAN interface 304 functions to facilitate buffered data communication with a content client. The LAN interface 304 provides content input to a content client and receives interaction output from the content client. The LAN interface 304 can be implemented using one or more modules comprised of a simple buffer with input/output capabilities. Well-known examples of such modules are remote-desktop applications (e.g., Windows Remote Desktop, Chrome Remote Desktop, Real VNC, VNC Viewer, Tight VNC) and virtual private network (VPN) applications. It should be appreciated that while remote-desktop applications and VPN applications suffice to implement the functionality of the LAN interface 304, any module having a simple buffer with input/output capabilities can suffice. In an alternative the virtualized asset local provisioning server 302 is coupled to a content client via a bus, which can replace the LAN interface 204, or via a PAN interface, which can replace the LAN interface 204.

The virtualized asset exploiting engine 306 functions to determine a manner to exploit a virtualized asset and exploit the virtualized asset based on the determined manner. A determined manner to exploit a virtualized asset can include but is not limited to determining a virtualized asset or portion thereof needed to exploit a virtualized asset at the virtualized asset exploiting engine 306 according to received interaction output. For example, if a portion of a virtualized asset corresponding to user interaction is part of an application, the virtualized asset exploiting engine 306 can execute a part of an application that is contained in or associated with the portion of the virtualized asset.

In a specific implementation, the virtualized asset exploiting engine 306 functions to determine a manner to exploit a virtualized asset based on, at least in part, the type of virtualized asset to be exploited. Depending upon implementation-specific or other considerations, if a virtualized asset is associated with an application, a determined manner of exploiting the virtualized asset can include executing the application or a part of the application. Depending upon implementation-specific or other considerations, it can be desirable to provide data or peripheral virtualized assets associated with data or engines peripheral to an application (e.g., serial (e.g., streaming) audio or multimedia files or drivers), and a determined manner of exploiting the virtualized asset can include a data transfer without substantial processor involvement (e.g., Direct Memory Access).

In a specific implementation, the virtualized asset exploiting engine 306 functions to determine a manner to exploit a virtualized asset based on, at least in part, a history of virtualized assets being exploited. Depending upon implementation-specific or other considerations, a determined manner of exploiting a virtualized asset can include determining assets or portions thereof recently exploited by the virtualized asset exploiting engine 306. For example, if the virtualized asset exploiting engine 306 is currently executing a function that is part of a collection of related functions, the virtualized asset exploiting engine 306 can determine a virtualized asset associated with a most-likely next desired function.

The virtualized asset exploiting engine 306 functions to exploit a virtualized asset based on a determined manner to exploit a virtualized asset. In a specific implementation, the virtualized asset exploiting engine 306 exploits a virtualized asset after a portion of the virtualized asset is received and stored locally at the virtualized asset local provisioning server 302. Depending upon implementation-specific or other considerations, portions of a virtualized asset can be stored locally in a cache memory of the virtualized asset local provisioning server 302 at the asset datastore 316. Local cache memory can be updated as new virtualized assets or portions thereof are received and stored in the cache memory. For example, updating cache memory can include deleting old virtualized assets or portions of virtualized assets from the cache memory. Old virtualized assets or portions of virtualized assets can be deleted based upon the length of time since they were last exploited. Even after old virtualized assets or portions of virtualized assets are deleted from local cache memory, the old virtualized assets or portions of virtualized assets can still appear to reside locally in the cache memory of the virtualized asset local provisioning server 302. For example, if the virtualized asset exploiting engine 306 needs a virtualized asset or portion of a virtualized asset deleted from local cache memory, then the virtualized asset or the portion of the virtualized asset can be resent to the virtualized asset exploiting engine 306 and stored again in local cache memory.

In a specific implementation, the virtualized asset exploiting engine 306 functions to exploit a virtualized asset once it has received a sufficient number of portions (e.g., portions received reach or surpass an executable threshold) of the virtualized asset. The virtualized asset exploiting engine 306 can also continue to exploit a virtualized asset by receiving additional portions of the virtualized asset that are not stored on or do not reside locally on the virtualized asset local provisioning server 302 but are possibly needed to continue exploiting the virtualized as set.

In a specific implementation, the virtualized asset exploiting engine 306 functions to determine a manner to exploit a virtualized asset using, at least in part, the instance(s) of a content client 318. An instance of a content client can be a map of assets available to content clients. An instance can include metadata that identifies available assets. An asset can be available to a content client if the content client or its user is authorized to access the asset (e.g., has a license to use the asset). For example, if a user at a content client has purchased the right to use an application, then the application, as an asset, is available. An instance can include an access control token that allows a content client to access an available in accordance with the access control token. In a specific implementation, exploiting a virtualized asset depends on whether a user at a content client has access rights to an asset corresponding to the virtualized asset.

In a specific implementation, the virtualized asset exploiting engine 306 functions to determine a manner to exploit a virtualized asset based on communications with the instance management engine 308 of the virtualized asset local provisioning server 302. The instance management engine 308 functions to create and maintain one or more instances of a content client. The instances of a content client can be stored at the client instance datastore 318. Depending upon implementation-specific or other considerations, the instance management engine 308 can create and maintain multiple instances for multiple users at a single content client. Further depending upon implementation-specific or other considerations, the instance management engine 308 can create and maintain instances for multiple content clients. Various implementations of the instant management engine creating and maintaining instances of a content client to facilitate determination of a manner to exploit a virtualized asset by the virtualized asset exploiting engine 306 are discussed below.

In a specific implementation, the instance management engine 308 creates a new instance by updating a previously created instance. The previously created instance can be removed after a new instance is created by updating the previously created instance. As a result, the new instance can replace the previously created instance updated to create the new instance. The previously created instance updated to create the new instance can also remain at the client instance 318. As a result, the previously created instance can be used to restore a content client to a state described by the previously created instance.

In a specific implementation, the instance management engine 308 functions to maintain instances including state information of a content client. Depending upon implementation-specific or other considerations, state information can include what interaction output is being generated by a content client at or near the time an instance is created. Further depending upon implementation-specific or other considerations, state information can also include how interaction output is being generated by a content client. Further depending upon implementation-specific or other considerations, state information can also include information relating to content input rendered at a content client at or near a time an instance is created. For example, state information can include an identifying feature of an image being rendered at a content client near a time an instance associated with a content client was created. Further depending upon implementation-specific or other considerations, state information can also include how content input is being rendered at a content client. State information can be used as a mechanism for data recovery. Specifically, in the event of a catastrophic failure or crash of a content client, state information can be used to restore a content client to a state existing before the catastrophic failure or crash of the content client.

In a specific implementation, the instance management engine 308 functions to maintain instances including asset history information. Asset history information can include but is not limited to interaction output generated by and content input received by a content client over a period of time. Depending upon implementation-specific or other considerations, asset history information can be used to create asset association information, which can be included as part of an instance. Asset association information can include information about a degree to which different virtualized assets or portions thereof are related. Specifically, a degree to which virtualized assets or portions thereof are related can be based on how close in time virtualized assets or portions thereof are exploited. For example, if the virtualized asset local provisioning server 302 runs a first application and shortly thereafter runs a second application, then a degree to which a virtualized asset of or associated with the first application is related to a virtualized asset of or associated with the second application is high. A degree of relation between virtualized assets can be determined through any relational algorithm or determination method and can be expressed through any assessment mechanism or value (e.g., a relation score). Further depending upon implementation-specific or other considerations, asset association information can be used to facilitate provision of a virtualized asset or portion thereof to the virtualized asset local provisioning server 302 before the virtualized asset local provisioning server 302 generates a request for the virtualized asset or portion thereof. For example, if the virtualized asset local provisioning server 302 begins to execute a first application and determines a second application exists associated with the first application, then a virtualized asset or portion thereof associated with the second application can be provided to the virtualized asset local provisioning server 302 before the virtualized asset local provisioning server 302 generates a request to retrieve the virtualized asset or portions thereof.

In a specific implementation, the instance management engine 308 functions to maintain instances including information about characteristics of a content client or a user thereof. Depending upon implementation specific or other considerations, characteristics of a content client can include information relating to geographical location of a content client. Further depending upon implementation specific or other considerations, characteristics of a content client can include information relating to frequency with which a user interacts with a particular asset.

In a specific implementation, the instance management engine 308 functions to maintain an instance unique for a particular user at a content client. As a result, an instance can contain information associated with a single user. In one implementation, an instance can be created for a given user over a particular amount of time. In one implementation, an instance can be created for a given user after the occurrence of a specific event. For example, an instance can be created for a specific user when a new asset becomes available to the user. In another example, an instance can be created based on content input received by or interaction output generated by a particular user.

In a specific implementation, the instance management engine 308 functions to maintain instances including time stamps that signify when each instance was created. In various implementations, timestamps can be used to restore a content client to a specific state existing at a certain time. For example, timestamps of instances can be used to restore a content client to a state that the content client was in at any time an instance was created. In various implementations, timestamps can also be used to determine at what times assets became available to a content client or to a user at the content client, and/or for how long the assets were made available.

The memory management engine 310 functions to intercept a request for a portion of a virtualized asset generated in response to exploiting a virtualized asset. In the case where a portion of a virtualized asset does not locally reside at an asset datastore, the virtualized asset local provisioning server 302 would crash if its operating system were allowed to process the request because the operating system would not be able to fulfill the request. The memory management engine 310 intercepts the request in order to prevent it from reaching an operating system of the virtualized asset local provisioning server 302. In the case where a requested portion of a virtualized asset does not locally reside at an asset datastore, the memory management engine 310 intercepts the request and sends the request to an asset portion request and retrieval engine.

The asset portion request and retrieval engine 312 functions to request, over a WAN, a virtualized asset delivery system to retrieve a virtualized asset. The asset portion request and retrieval engine 312 requests retrieval of a virtualized asset by a virtualized asset delivery system. The asset portion request and retrieval engine 312 can request retrieval of a virtualized asset after the virtualized asset local provisioning server 302 determines the virtualized asset to be absent from an asset datastore. Depending upon implementation specific or other considerations, the asset portion request and retrieval engine 312 can request retrieval of a virtualized asset based on information received from an instance management engine and information stored in one or more client instance datastores. For example, if a client instance datastore stores geographical location of a user at a content client, then the virtualized asset local provisioning server 302 can request retrieval of information concerning the geographical location. Further depending upon implementation specific or other considerations, the asset portion request and retrieval engine 312 can request retrieval of a virtualized asset based on virtualized assets a virtualized asset delivery system predicts will be exploited by the virtualized asset local provisioning server 302, as will be further discussed below.

The access engine 314 functions to determine whether a user at a content client has rights needed to exploit virtualized assets at the virtualized asset local provisioning server. In a specific implementation, the virtualized asset local provisioning server 302 can provide content input for rendering at a content client if the access engine 314 determines a content client has rights to access the virtualized asset. In a specific implementation, the virtualized asset local provisioning server 302 can exploit a virtualized asset if the access engine 314 determines a content client has rights to access the virtualized asset. In another specific implementation, the virtualized asset local provisioning server 302 can request a virtualized asset delivery system retrieve a virtualized asset if the access engine 314 determines a content client has rights to access the virtualized asset. In another specific implementation, the virtualized asset local provisioning server 302 does not exploit a virtualized asset if the access engine 314 determines a content client does not have rights to access the virtualized asset. In yet another specific implementation, the virtualized asset local provisioning server 302 does not exploit a virtualized asset if the access engine 314 determines a content client does not have rights to access the virtualized asset. In yet another specific implementation, the virtualized asset local provisioning server 302 does not request a virtualized asset delivery system retrieve a virtualized asset if the access engine 314 determines a content client does not have rights to access the virtualized asset.

In a specific implementation, the access engine 314 determines whether a content client has rights to access a virtualized asset based on communications with the instance management engine 308 and/or the client instance datastore 314. In a specific implementation, the client instance datastore 314 contains a database of users or a subset of users at a content client(s), and further contains information relating to the access levels of each user. For example, a client instance corresponding to a particular content client could store that user one has rights to view the entire "Gone With the Wind" movie as streamed on the virtualized asset local provisioning server 302, while user two can only view a portion of the movie. In another example, client instance one corresponds to content client one, client instance two corresponds to content client two, and the levels of access rights vary between users at content client one and users at content client two.

The asset datastore 316 functions to contain virtualized assets or portions thereof. The asset datastore 316 can function to contain virtualized assets related virtualized assets currently being exploited by the virtualized asset local provisioning server 302. For example, if the virtualized asset local provisioning server 302 has provided a first image, then the asset datastore can contain a second expected image. Depending upon implementation-specific or other considerations, the asset datastore 316 can function to store predicted virtualized assets or portions thereof assets received from a virtualized asset delivery system, as will be discussed further.

In the example of operation of the example system shown in FIG. 3, the LAN interface 304 receives from a content client interaction output based on user interaction with rendered content input representing a virtualized asset being exploited. If the access engine 314 determines that a user at the content client has rights to access the virtualized asset, the virtualized asset exploiting engine 306 will determine a manner to exploit the virtualized asset and will exploit the virtualized asset based on the determined manner. The virtualized asset exploiting engine 306 can determine the manner to exploit the virtualized asset based on communication with the instance management engine 308. The memory management engine 310 intercepts a request for a portion of the virtualized asset and checks whether the portion resides locally at the asset datastore 316. If the portion of the virtualized asset resides locally, then the memory management engine 310 returns the portion to the virtualized asset exploiting engine 306 to exploit based on the determined manner. If the portion of the virtualized asset is absent locally, then the memory management engine 310 prevents the request from reaching the operating system of the virtualized asset local provisioning server 302 and sends to a virtualized asset delivery system a request to retrieve the portion of the virtualized asset.

Figure 4:
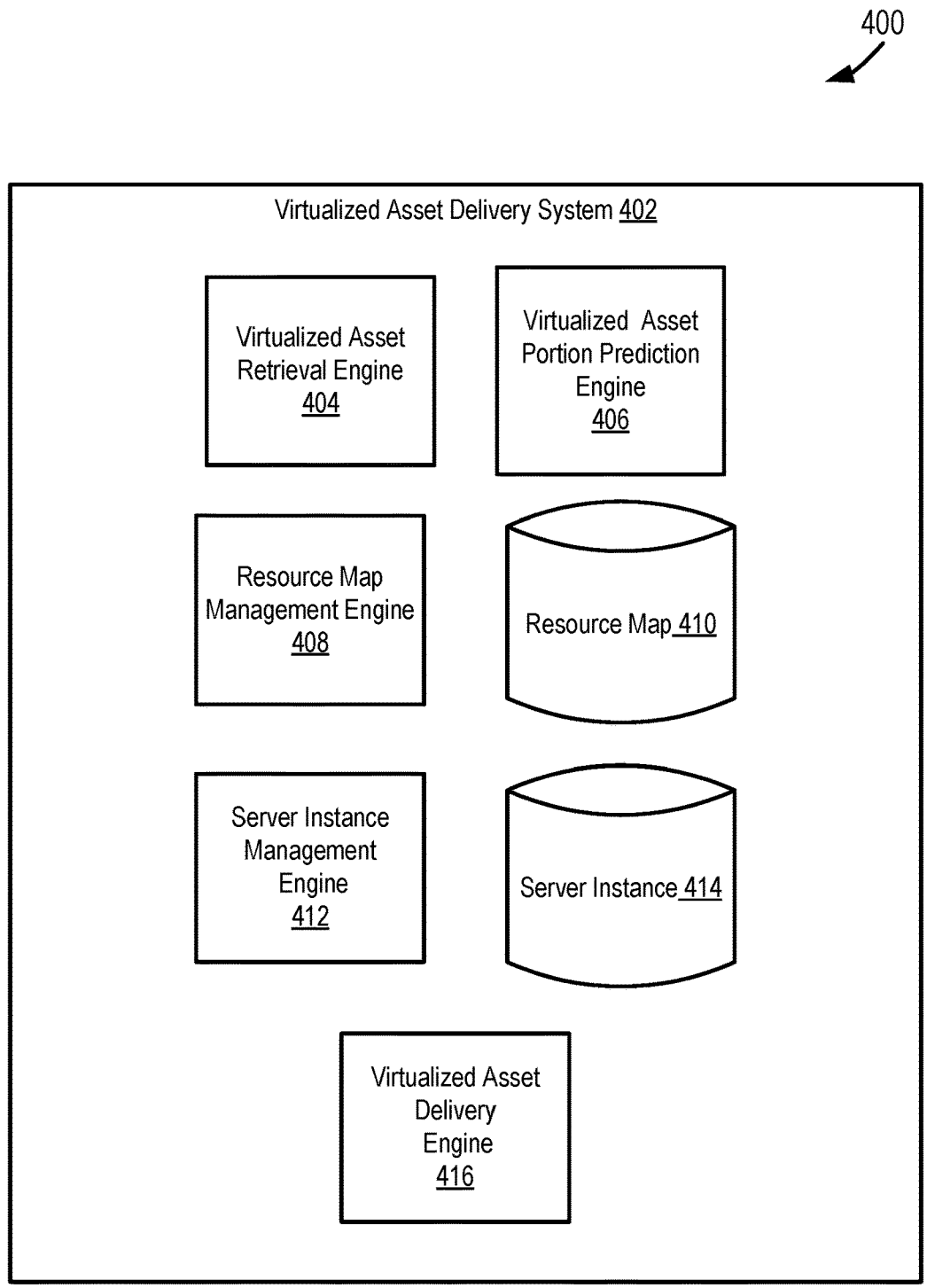
FIG. 4 depicts a diagram 400 of an example of a virtualized asset delivery system.

FIG. 4 depicts a diagram 400 of an example of a virtualized asset delivery system 402. The virtualized asset delivery system 402 functions according to an applicable system for virtualizing assets remote from a content client, such as systems described in this paper. The virtualized asset delivery system 402 shown in FIG. 4 includes a virtualized asset retrieval engine 404, a virtualized asset portion prediction engine 406, a resource map management engine 408, a resource map datastore 410, a server instance management engine 412, a server instance datastore 414, and a virtualized asset delivery system 416.

The virtualized asset retrieval engine 404 functions to retrieve a portion of a virtualized asset based on a request received from a virtualized asset local provisioning server. The virtualized asset retrieval engine 404 can retrieve a portion of a virtualized asset based on a mapping of a physical location of the virtualized asset. In a specific implementation, the virtualized asset retrieval engine 404 can retrieve a portion of a virtualized asset based on a virtualized asset predicted to be exploited by a virtualized asset local provisioning server.

The virtualized asset portion prediction engine 406 functions to predict a predicted portion of a virtualized asset based on a portion of a virtualized asset and provide the predicted portion to a virtualized asset local provisioning server. The predicted portion of a virtualized asset can be based on what the virtualized asset portion prediction engine 406 determines a virtualized asset local provisioning server will exploit. For example, if a virtualized asset local provisioning server is currently executing Microsoft Word, the virtualized asset portion prediction engine 406 can predict the virtualized asset local provisioning server will need portions of virtualized assets related to graphics and functionalities available in the executing Microsoft Word program.

In a specific implementation, the virtualized asset portion prediction engine 406 predicts one or more virtualized assets or portions thereof a virtualized asset local provisioning server will request. The virtualized asset portion prediction engine 406 can include an aggressiveness parameter (not shown). If the aggressiveness is high, the virtualized asset portion prediction engine 406 is more likely to make a prediction than if the aggressiveness is low. In one example, the aggressiveness parameter is associated with a probability threshold. The probability threshold can be a cut-off probability that results in predictions being made for assets or portions of assets that are determined to have a probability of being requested that exceeds the cut-off probability. In another example, the virtualized asset portion prediction engine 406 can predict a virtualized asset or portion thereof a probability of being requested that is higher than the probability threshold. In these examples, it should be noted that the aggressiveness parameter is low (i.e., the probability threshold is low) when aggressiveness is high. Nevertheless, for the purposes of linguistic clarity, hereinafter, it is assumed that the aggressiveness parameter is high when aggressiveness is high. For example, if the aggressiveness parameter is associated with a threshold probability, x, then the value of the aggressiveness parameter may be thought of as 1?x, which means the aggressiveness parameter is high when aggressiveness is high. This is for the purposes of linguistic clarity, and should not be construed as a limitation as to how the aggressiveness parameter is implemented. It should also be noted that the aggressiveness parameter is not limited to a threshold probability.

When the virtualized asset portion prediction engine 406 makes a prediction, the virtualized asset delivery system 402 can communicate the prediction to a virtualized asset local provisioning server. The prediction may include identifying data for one or more assets or portions of assets, each of which met aggressiveness criteria, such as by having a predicted probability of being requested that is higher than a probability threshold. Identifying data, as used herein, can be data sufficient to enable a virtualized asset local provisioning server to make a request for the virtualized assets or portions thereof are associated with the identifying data. The identifying data can, for example, include an asset ID associated with a virtualized asset. This identifying data can facilitate predictive requests for virtualized assets or portions thereof before the virtualized assets or portions thereof are actually needed at a virtualized asset local provisioning server. In one example, wherein the identifying data is provided to a virtualized asset local provisioning server, the virtualized asset local provisioning server can determine whether to request a virtualized asset associated with the identifying data. This may help prevent transfer of a virtualized asset not wanted or needed by a virtualized asset local provisioning server. For example, if the virtualized asset portion prediction engine 406 predicts a virtualized asset local provisioning server will need data associated with a first virtualized asset or portions thereof, and sends data associated with the first virtualized asset or portions thereof, the virtualized asset local provisioning server is unable to choose whether to receive the data based on, for example, local factors. On the other hand, if the virtualized asset local provisioning server receives identifying data, the virtualized asset local provisioning server can determine whether it actually wants the data. In an alternative embodiment, the virtualized asset portion prediction engine 406 can immediately serve data associated with a predicted virtualized asset or portion thereof, possibly without even receiving a request for the predicted virtualized asset or portion thereof from a virtualized asset local provisioning server.

The virtualized asset portion prediction engine 406 can give a weight to a number of virtualized assets or portions thereof. For example, the virtualized asset portion prediction engine 406 can predict a virtualized asset or portions thereof more likely to be requested than a second virtualized asset or portions thereof (a probability parameter). A virtualized asset local provisioning server can first request the virtualized asset or portions thereof with, for example, the highest probability of being requested. As another example, the virtualized asset portion prediction engine 406 can give greater weight to a first virtualized asset or portions thereof over a second virtualized asset or portions thereof if the virtualized asset portion prediction engine 406 predicts the first virtualized asset or portions thereof will be requested sooner than the second virtualized asset or portions thereof (a temporal parameter). As another example, the virtualized asset portion prediction engine 406 can give greater weight to a first virtualized asset or portions thereof over a second virtualized asset or portions thereof if the first virtualized asset or portions thereof is larger than the second virtualized asset or portions thereof (a size parameter). The virtualized asset portion prediction engine 406 can weigh parameters associated with a virtualized asset local provisioning server as well. For example, if a virtualized asset local provisioning server has a limited buffer size, the aggressiveness parameter may be set lower. As another example, if the download bandwidth is low, the virtualized asset portion prediction engine 406 can place more weight on temporal or size parameters. Alternatively, a virtualized asset local provisioning server can manage block requests according to local conditions, while the virtualized asset portion prediction engine 406 acts the same for all or a subset of all virtualized asset local provisioning servers.

The virtualized asset portion prediction engine 406 can communicate with the server instance management engine 412 and use data stored in one or more server instance datastore 414 to predict a subsequent virtualized asset or portions thereof. For example, the virtualized asset portion prediction engine 406 can use information about the characteristics of virtualize asset provisioning servers, information about the degree to which different virtualized assets being exploited or portions thereof are related, virtualized asset history information, state information or any combination of, to predict virtualized assets or portions thereof. The subsequent virtualized asset or portions thereof request can be for, for example, a virtualized asset or portions thereof from the same virtualized application as the initial virtualized asset or portions thereof request, from a DLL, from a data file, from a different executable file, or from any other file or virtualized asset or portions thereof. The virtualized asset delivery system 402 sends data associated with the requested virtualized asset or portions thereof and identifying data associated with the predicted virtualized asset or portions thereof to a virtualized asset local provisioning server. The virtualized asset local provisioning server can then decide whether to request the identified predicted virtualized asset or portions thereof. For example, a virtualized asset local provisioning server may already have data for a virtualized asset or portions thereof associated with the identifying data in its local cache. If the virtualized asset delivery system 402 sends the data again, that is a waste of bandwidth and may slow down the execution of the virtualized application at the virtualized asset local provisioning server. Since the virtualized asset delivery system 402 sends identifying data instead of the virtualized asset or portions thereof, the virtualized asset local provisioning server can, for example, check its local cache first, and request the virtualized asset or portions thereof if it is not already available in the local cache.

The resource map management engine 408 functions to map a request for a portion of a virtualized asset to a physical location where the portion of the virtualized asset resides. The resource map management engine 408 can map a request for a portion of a virtualized asset using a resource map datastore. For example, the resource map management engine 408 can identify a requested portion of a virtualized asset from a request and determine a physical location of the portion of the virtualized asset using a resource map datastore. Depending upon implementation-specific or other considerations, the resource map management engine 408 can map a request to a physical location of a portion of a virtualized asset remote from a content client. For example, the resource map management engine 408 can map a request for a portion of a file in a game to a server remote from a content client.

In a specific implementation, the resource map management engine 408 functions to map a request to a physical location of a portion of a virtualized asset using a virtual file map. Depending upon implementation-specific or other considerations, the resource map management engine 408 can use a virtual file map to map a request to a result of executing a file or portions of a file remotely from a content client. For example, the resource map management engine 408 can use a virtual file map to map a request for a portion of a level to a result of executing a portion of a file representing the portion of the level in a game using the corresponding game at a remote location from a content client. Further depending upon implementation-specific or other considerations, the resource map management engine 408 can use a virtual file map to map a request for exploiting a virtualized asset in a determined manner to portions of a file of the virtualized asset for exploiting the virtualized asset according to the determined manner. For example, the resource map management engine 408 can use a virtual file map to map a request for moving a character in a game to a specific point in a level to the specific portions of a file needed for execution to move the character in the game to the specific point.

The resource map datastore 410 functions to store resource map data indicating resource maps for use in mapping virtualized assets to physical locations where virtualized assets reside. Resource maps stored in the resource map datastore 410 can include location information including physical addresses or URLs of virtualized assets and portions of virtualized assets and logical addresses of the virtualized assets and portions of virtualized assets. Depending upon implementation-specific or other considerations, physical addresses can represent physical locations on a server remote from a content client. In various implementations, a resource map stored in the resource map datastore 410 can map specific manners in which a virtualized asset can be exploited and a portion or portions of a virtualized asset corresponding to the virtualized asset used in exploiting the asset in the specific manners. For example, a resource map can include a map of portions of a virtualized asset executed to cause execution of a level in a game.

In a specific implementation, the resource map datastore 410 functions to store resource map data indicating a virtual file map for use in virtualizing an asset remote from a content client. Depending upon implementation-specific or other considerations, a virtual file map indicated by resource map data stored in the resource map datastore 410 can include a map to a result of executing a file or portions of a file remote from a content client. For example, a virtual file map can include a map indicating a result of executing a portion of a file representing a portion of a level in a game using the corresponding game at a remote location from a content client. Further depending upon implementation-specific or other considerations, a virtual file map indicated by resource map data stored in the resource map datastore 410 can include a mapping of specific manners in exploiting a virtualized to portions of a file of the virtualized asset for exploiting the virtualized asset according to the specific manners. For example, a virtual file map can include a map of moving a character in a game to a specific point in a level and the specific portions of a file needed for execution to move the character in the game to the specific point.

In a specific implementation, resource map data stored in the resource map datastore 410 is stored, at least in part, like a TLB. Specifically, the TLB can include a map of logical addresses of virtualized assets or portions of virtualized assets and the corresponding physical addresses of virtualized assets or portions of virtualized assets. The TLB can be searched by looking up a logical address of a virtualized asset or portions of a virtualized asset and returning the physical address of the asset or portion of an asset if a match is found to the logical address. Additionally, if the physical address of a virtualized asset or a portion of a virtualized asset changes, the TLB can be updated to reflect the change in the physical address.

The server instance management engine 412 functions to create and maintain one or more server instance datastores 414 to facilitate exploiting a virtualized asset at a virtualized asset local provisioning server. The server instance management engine 412, based on information stored in a server instance datastore, can retrieve virtualized assets and provide the virtualized assets to a virtualized asset local provisioning server. In a specific implementation, the server instance management engine 412, based on information stored in a server instance datastore, can be used in facilitating prediction of a virtualized asset.

In a specific implementation, the server instance management engine 412 maintains a history of requests to retrieve virtualized assets received at the virtualized asset delivery system 402. In various implementations, a history of virtualized assets requested can include virtualized assets requested during a fixed period of time. In various implementations, a history of virtualized assets requested can include virtualized assets requested after a specific event occurred. In various implementations, a history of virtualized assets requested can include virtualized assets requested until a specific event occurred. For example, the server instance management engine 412 can store in the server instance datastore 414 all requests for virtualized assets relating to a word-processing application executing at a virtualized asset local provisioning server until a request to retrieve is received relating to another type of virtualized asset, such as a request to retrieve a movie clip for streaming. In various implementations, the virtualized asset delivery system 402 can use a history of requests stored in the server instance datastore 414 to prioritize its retrieval of and provision of virtualized assets. In a specific implementation, the virtualized asset delivery system 402 can decide to retrieve virtualized assets based on an order in which it received requests to retrieve the virtualized assets, the order being stored in the server instance datastore 414 and maintained by the server instance management engine 412. In other implementations, the virtualized asset delivery system 402 can decide to provide retrieved virtualized assets based on an order in which it received the requests to retrieve the virtualized assets, the order being stored in the server instance datastore 414 and maintained by the server instance management engine 412. In various implementations, information relating to virtualized assets retrieved can be used to optimize a resource map of the virtualized asset delivery system 402, the information being stored in the server instance datastore 414 and maintained by the server instance management engine 412. In a specific implementation, a virtualized asset frequently retrieved can be readdressed to a memory location the virtualized asset delivery system 402 can more quickly access for subsequent retrievals, an identity of the virtualized asset being stored in the server instance datastore 414 and maintained by the server instance management engine 412.

In various implementations, a server instance datastore 414 can include a history of virtualized assets provided to a virtualized asset local provisioning server by the virtualized asset delivery system 402. In various implementations, the history of virtualized assets provided can include virtualized assets provided during a fixed period of time. In various implementations, the history of virtualized assets provided can include virtualized assets provided after a specific event occurred. In various implementations, the history of virtualized assets provided can include virtualized assets provided until a specific event occurred.

A server instance datastore 414 can include information about characteristics of a virtualized asset local provisioning server. In various implementations, a characteristic of a virtualized asset local provisioning server can include what application is executing on a virtualized asset local provisioning server. In various implementations, a characteristic of a virtualized asset local provisioning server can include what portions of an application are being provided by a virtualized asset local provisioning server. In various implementations, a characteristic of a virtualized asset local provisioning server can include what virtualized asset is being remotely stored at a virtualized asset local provisioning server. In various implementations, a characteristic of a virtualized asset local provisioning server can include a virtualized asset local provisioning server's installed software and hardware. In various implementations, a characteristic of a virtualized asset local provisioning server can include a current operating state of a virtualized asset local provisioning server. In various implementations, a characteristic of a virtualized asset local provisioning server can include a real-time or near real-time operating state of a virtualized asset local provisioning server. In a specific implementation, a server instance can include an amount of memory and processing usage (i.e., CPU usage) of a virtualized asset local provisioning server at the time a virtualized asset local provisioning server sends a request to retrieve to the virtualized asset delivery system 402. For example, the server instance management engine 412 can store in the server instance 414 that, upon receiving a request to retrieve from a virtualized asset local provisioning server, the virtualized asset local provisioning server was using a substantial amount of its available memory (RAM), and consequently the virtualized asset delivery system 402 can choose to delay the retrieval until the virtualized asset local provisioning server frees up more available memory.

The virtualized asset delivery engine 416 functions to send, over a WAN, portions of a virtualized asset to a virtualized asset local provisioning server. In a specific implementation, the virtualized asset delivery engine 416 sends portions of a virtualized asset based on an address mapping of the virtualized asset or portions thereof. In another specific implementation, the virtualized asset delivery engine 416 sends portions of a virtualized asset based on information stored in the server instance datastore 414. In yet another specific implementation, the virtualized asset delivery engine 416 sends portions of a virtualized asset based on predicted virtualized assets.

In an example of operation of the example system shown in FIG. 4, the virtualized asset retrieval engine 404 receives from a virtualized asset local provisioning server a request to retrieve a portion of a virtualized asset. The virtualized asset retrieval engine 404 can retrieve the portion of the virtualized asset based on a mapping of a physical location of the virtualized asset by communicating with the resource map management engine 408. The resource map management engine 408 maps a request for the portion of the virtualized asset to a physical location where the portion of the virtualized asset resides. The resource map management engine 408 can store mapping information in the resource map datastore 410. The virtualized asset delivery engine 416 can provide the retrieved virtualized asset to a virtualized asset local provisioning server.

In another example of operation of the example system shown in FIG. 4, the virtualized asset delivery engine 416 can provide a retrieved portion of a virtualized asset to a virtualized asset local provisioning server, wherein the portion of the virtualized asset is, at least in part, a predicted virtualized asset. The virtualized asset portion prediction engine, based on information about one or more virtualized asset local provisioning server stored in the server instance datastore 414 by the server instance management engine 412, can provide to the virtualized asset retrieval engine 404 predicted virtualized assets or portions thereof. The virtualized asset retrieval engine 404 can retrieve the virtualized assets or portions thereof, possibly using information stored in the resource map datastore 410.

Figure 5:
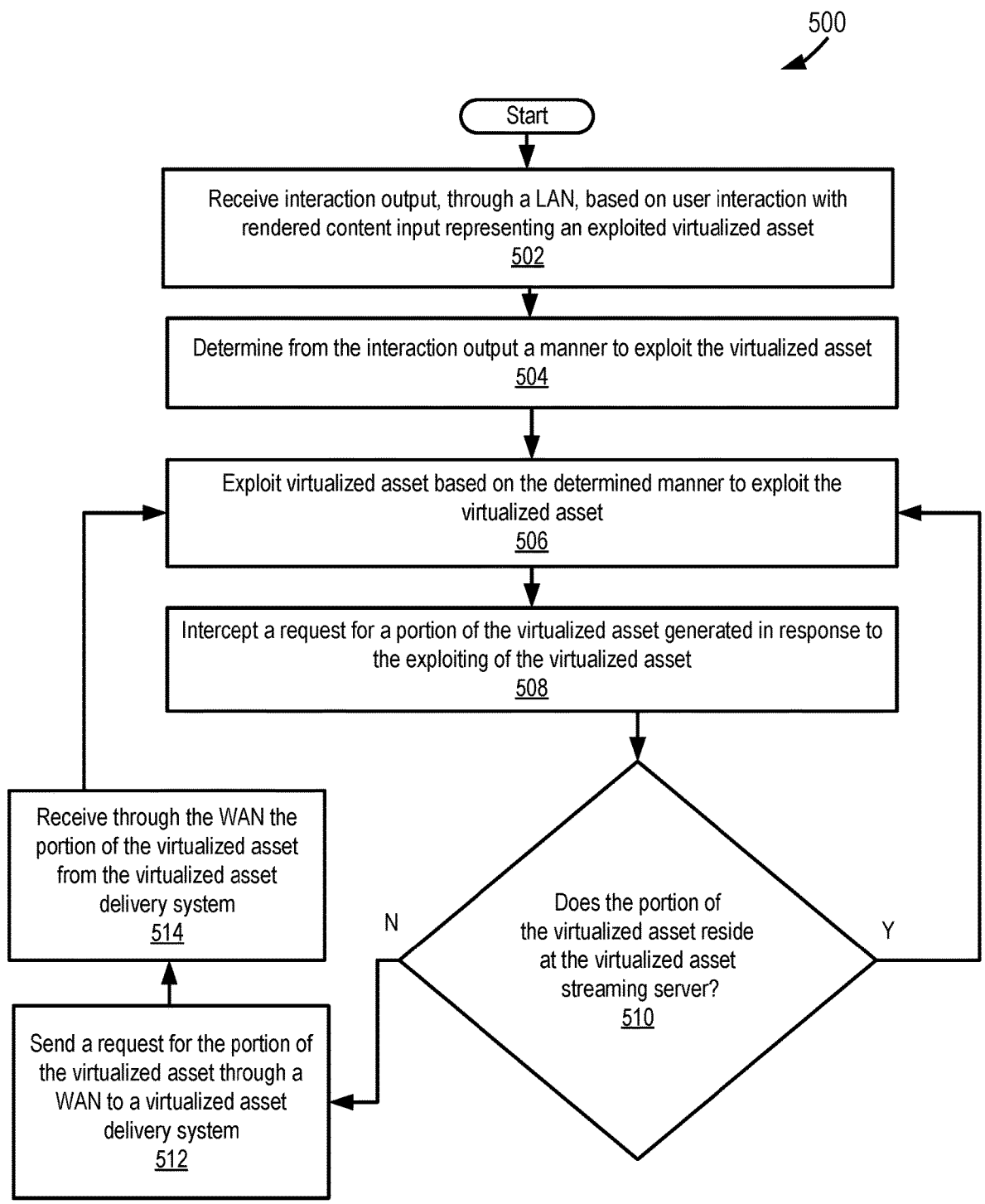
FIG. 5 depicts a flowchart of an example of a method for virtualizing assets at a server remote from a content client.

FIG. 5 depicts a flowchart 500 of an example of a method for virtualizing assets at a server remote from a content client. The flowchart 500 begins at module 502, where interaction output over a LAN generated based on user interaction with rendered content input representing a virtualized asset being exploited corresponding to an asset virtualized remotely from a content client at the virtualized asset local provisioning server is received at the virtualized asset local provisioning server. An applicable engine for generating interaction output, such as the content interaction engines described in this paper, can generate the interaction output. An applicable engine for facilitating user interaction with rendered content input, such as the content rendering engines described in this paper, can facilitate the user interaction with the rendered content input. In various implementations, interaction output can include instructions how to exploit a virtualized asset. In various implementations, interaction output can include how a user at a content client interacts with rendered content input.

The flowchart 500 continues to module 504, where a virtualized asset local provisioning server determines a manner to exploit a virtualized asset based on received interaction output. An applicable engine for determining a manner to exploit a virtualized asset, such as the virtualized asset exploiting engines described in this paper, can determine the manner to exploit the virtualized asset. In various implementations, a determined manner to exploit a virtualized asset depends on the type of the virtualized asset. In various implementations, a determined manner to exploit a virtualized asset depends on the history of virtualized asset being exploited. In various implementations, a determined manner to exploit a virtualized asset is based on content client instances at a virtualized asset local provisioning server. Client instance information can be created and maintained by using an applicable engine, such as the instance management engines described in this paper. For example, client instance information can include video graphics capabilities at a content client, and a manner of exploiting a virtualized asset corresponding to a video file can be determined according to the video graphics capabilities.

The flowchart 500 continues to module 506, where a virtualized asset local provisioning server exploits a virtualized asset based on a determined manner to exploit the virtualized asset. An applicable engine for exploiting a virtualized asset based on a determined manner to exploit the virtualized asset, such as the virtualized asset exploiting engines described in this paper, can exploit the virtualized asset based on the determined manner to exploit the virtualized asset. In various implementations, a virtualized asset is exploited after a portion of the virtualized asset is stored locally at a virtualized asset local provisioning server.

The flowchart 500 continues to module 508, where a request for a portion of the virtualized asset generated in response to the exploiting of the virtualized asset is intercepted. An applicable engine for intercepting a request for a portion of the virtualized asset, such as the memory management engines described in this paper, can intercept the request for a portion of the virtualized asset.

The flowchart 500 continues to decision point 510, where it is determined whether the portion of the virtualized asset resides locally at the virtualized asset local provisioning server. An applicable engine for determining whether the portion of the virtualized asset resides locally at the virtualized asset local provisioning server, such as memory management engines described in this paper, can determine whether the portion of the virtualized asset resides locally at the virtualized asset local provisioning server. Whether the portion of the virtualized asset resides locally at the virtualized asset local provisioning server can be determined based on whether the portion of the virtualized asset resides in local cache at the virtualized asset local provisioning server.

If it is determined that the portion of the virtualized asset resides locally at the virtualized asset local provisioning server, then the flowchart continues back to module 506.

If it is determined that the portion of the virtualized asset is absent from the virtualized asset local provisioning server, then the flowchart continues to module 512. At module 512, a virtualized asset local provisioning server sends a request, over a WAN, to a virtualize asset delivery system to retrieve the portion of the virtualized asset. An applicable engine for sending the request for retrieval, such as the asset portion request and retrieval engines described in this paper, can function to send the request for retrieval to a virtualized asset delivery system. In various implementations, a request for retrieval is based on client instance information.

The flowchart 500 continues to module 514, where the portion of the virtualized asset absent from the virtualized asset local provisioning server is received, over the WAN, by the virtualized asset local provisioning server. An applicable engine for receiving the portion of the virtualized asset, such as the asset portion request and retrieval engines described in this paper, can function to receive the portion of the virtualized asset. The flowchart 500 continues back to module 506.

Figure 6:
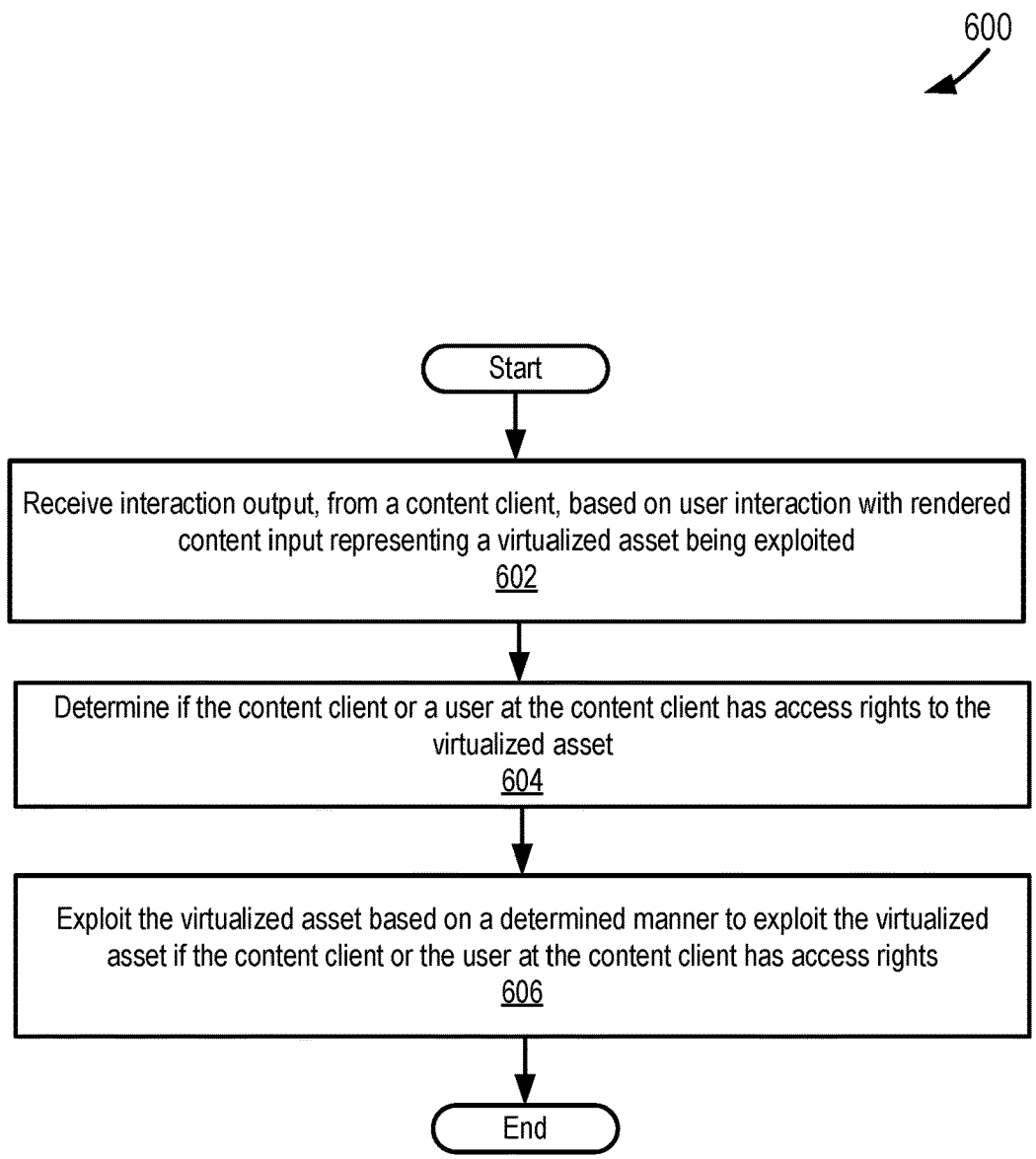
FIG. 6 depicts a flowchart of an example of a method for virtualizing assets at a server remote from a content client based on access control rights.

FIG. 6 depicts a flowchart 600 of an example of a method for virtualizing assets at a server remote from a content client based on access control rights. The flowchart 600 begins at module 602, where interaction output over a LAN generated based on user interaction with rendered content input representing a virtualized asset being exploited corresponding to an asset virtualized remotely from a content client at the virtualized asset local provisioning server is received at the virtualized asset local provisioning server.

The flowchart 600 continues to module 604, where a virtualized asset local provisioning server determines whether a content client or a user at the content client has access rights to the virtualized asset. An applicable engine for determining whether a content client or a user at the content client has access rights to the virtualized asset, such as the access engines described in this paper, can function to determine whether the content client or the user at the content client has access rights to the virtualized asset. In various implementations, a virtualized asset is exploited only if a user at a content client and/or the content client has access rights. In various implementations, a request for retrieval of virtualized assets occurs only if a user at a content client and/or the content client has access rights. In various implementations, determining access rights can be based on client instances at a virtualized asset local provisioning server. For example, a database of various users' rights at a virtualized asset local provisioning server can indicate that User X has access rights to play a game, and accordingly the virtualized asset local provisioning server exploits virtualized assets related files needed to execute the game.

The flowchart 600 continues to module 606, where a virtualized asset local provisioning server exploits a virtualized asset based on a determined manner of exploiting if the user and/or content client has access rights. An applicable engine for exploiting a virtualized asset based on a determined manner of exploiting if the user and/or content client has access rights, such as the virtualized asset exploiting engines described in this paper, can exploit the virtualized asset based on the determined manner of exploiting if the user and/or content client has access rights.

Figure 7:
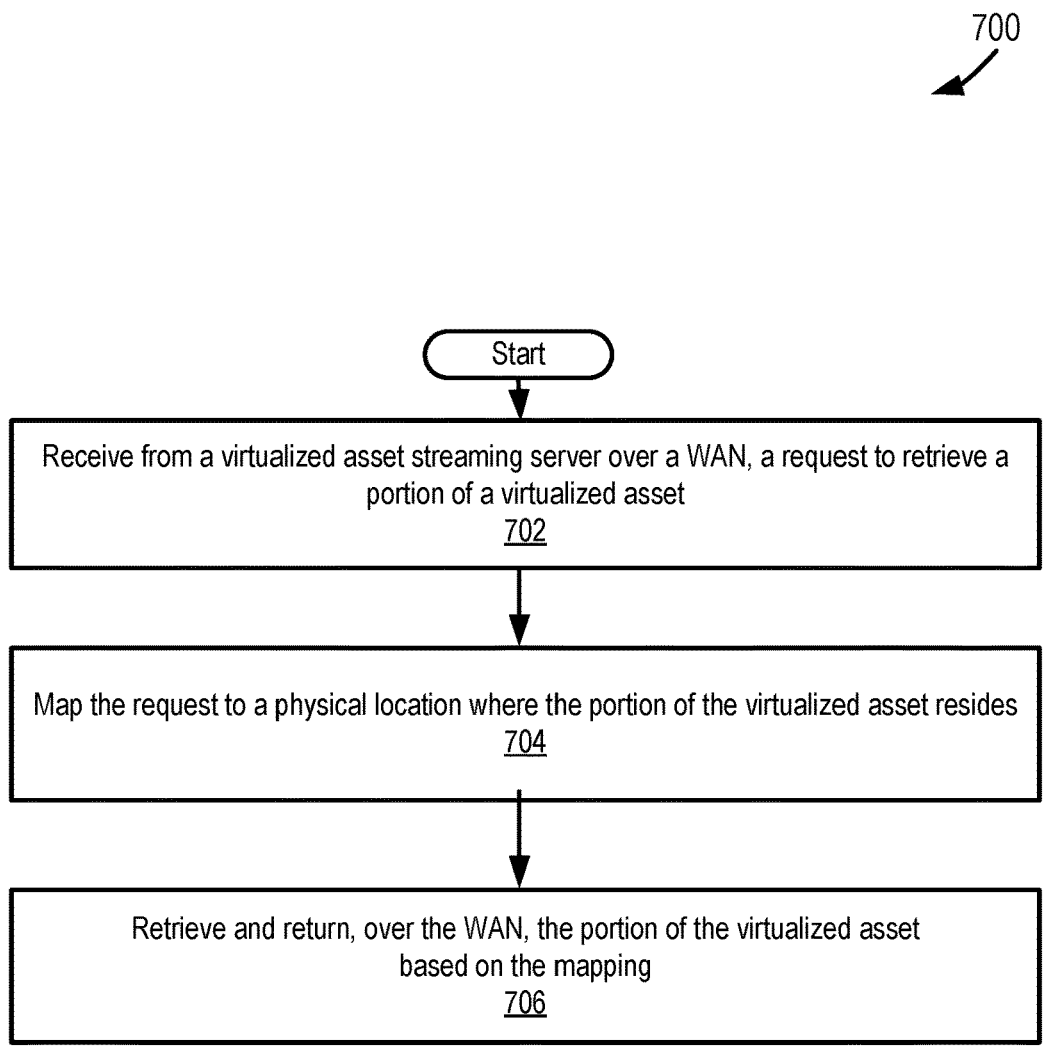
FIG. 7 depicts a flowchart of an example of retrieving and providing a requested portion of a virtualized asset based on mapping.

FIG. 7 depicts a flowchart 700 of an example of retrieving and providing a requested portion of a virtualized asset based on mapping. The flowchart 700 begins at module 702, where a request for a portion of a virtualized asset is received over a WAN by a virtualized asset delivery system from a virtualized asset local provisioning server. An applicable engine for receiving a request for a portion of a virtualized asset, such as the virtualized asset retrieval engines described in this paper, can receive the request for the portion of the virtualized asset.

The flowchart 700 continues to module 704, where a request for a portion of a virtualized asset is mapped to a physical location where the portion of the virtualized asset resides. An applicable engine for mapping a request for the portion of a virtualized asset to a physical location where the portion of the virtualized asset resides, such as the resource map management engines described in this paper, can map the request for the portion of the virtualized asset to the physical location where the portion of the virtualized asset resides. In various implementations, mapping is done using a virtual file map. For example, if a game is being exploited at a virtualized provisioning server, a request for a virtualized asset corresponding to map information of the game can be mapped to the physical location where the virtualized asset resides.

The flowchart 700 continues to module 706, where a requested portion of a virtualized asset is retrieved and returned, over the WAN, to a virtualized asset local provisioning server. Applicable engines for retrieving and returning a requested portion of a virtualized asset, such as the virtualized asset retrieval engines and the virtualized asset delivery engines, respectively, described in this paper, can retrieve and return the requested portion of the virtualized asset. In a specific implementation, a retrieved portion of a virtualized asset is sent based on information stored in a server instance at a virtualized asset delivery system. For example, the transfer of the portion of the virtualized asset can be delayed if a sever instance indicates that the receiving asset delivery server does not currently have sufficient memory to process the transfer.

Figure 8:
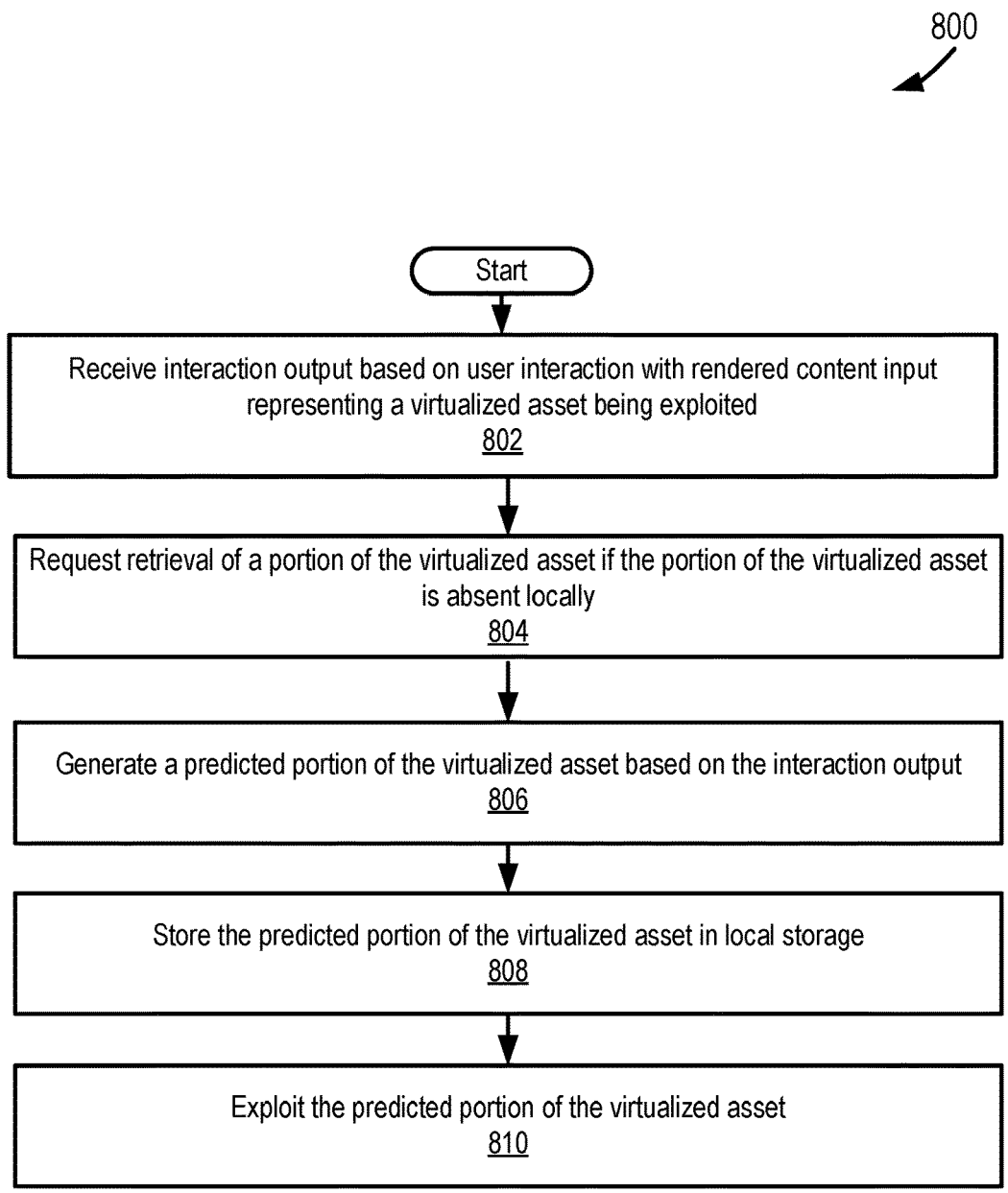
FIG. 8 depicts a flowchart of an example of a method for virtualizing assets at a server remote from a content client based on exploiting predicted assets.

FIG. 8 depicts a flowchart of an example of a method for virtualizing assets at a server remote from a content client based on exploiting predicted assets. The flowchart 800 begins at module 802, where interaction output over a LAN generated based on user interaction with rendered content input representing a virtualized asset being exploited corresponding to an asset virtualized remotely from a content client at the virtualized asset local provisioning server is received at the virtualized asset local provisioning server.

The flowchart 800 continues to module 804, where a virtualized asset local provisioning server sends a request, over a WAN, to a virtualize asset delivery system to retrieve the portion of the virtualized asset if the portion of the virtualized asset is absent locally.

The flowchart 800 continues to module 806, where a virtualized asset delivery system generates a predicted asset based on interaction output. An applicable engine predicting a virtualized asset, such as the virtualized asset portion prediction engines described in this paper, can predict the portion of the virtualized asset. In various implementations, a portion of a virtualized asset is predicted using server instances created and maintained by an engine, such as the server instance management engine described in this paper. In various implementations, a portion of a virtualized asset is predicted based on a history of exploited virtualized assets by a virtualized asset local provisioning server. The history of exploited virtualized assets can be stored at a virtualized asset delivery system at a datastore, such as the server instance datastores described in this paper. For example, if, based on interaction output, a particular movie clip is frequently exploited by a virtualized asset local provisioning server, an identity of or virtualized assets associated with the movie clip can be stored and maintained in the server instance datastores by a server instance management engine, and thereafter the identity or the virtualized assets associated with the movie clip used as the basis for predicting a portion of a virtualized asset.

The flowchart 800 continues to module 808, where a predicted portion of a virtualized asset is locally stored at a virtualized asset delivery system and/or at a virtualized asset local provisioning server. A predicted portion of a virtualized asset is locally stored until it is determined that it needs to be exploited. If a predicted portion of a virtualized asset is locally stored at a virtualized asset delivery system, the virtualized asset delivery system will provide the predicted portion to a virtualized asset local provisioning server after the virtualized asset delivery system determines the virtualized asset local provisioning server needs to exploit the predicted portion of the virtualized asset.

The flowchart 800 continues to module 810, where a predicted portion of a virtualized asset is exploited by a virtualized asset local provisioning server. Based on interaction output received from a content client, a virtualized asset local provisioning server can determine when to exploit the predicted portion of a virtualized asset. In various implementations, a predicted portion of a virtualized asset is locally stored at but not exploited by a virtualized asset local provisioning server if exploiting is not needed to satisfy interaction output from a content client. For example, if a predicted portion of a virtualized asset corresponds to a particular feature in a Word Processing program is stored locally at a virtualized asset local provisioning server, but interaction output does not indicate that the feature is being interacted with by a user at a content client, then the predicted portion of the virtualized asset will not be exploited by the virtualized asset local provisioning server.

Figure 9:
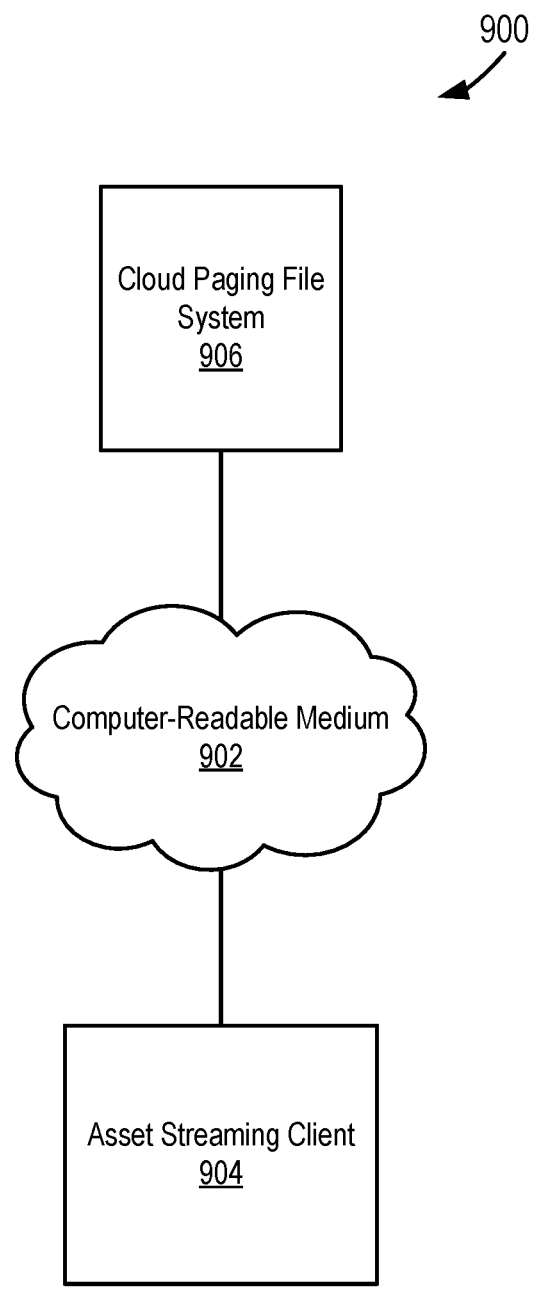
FIG. 9 depicts a diagram of an example of a system for provisioning and utilizing virtualized assets.

FIG. 9 depicts a diagram 900 of an example of a system for provisioning and utilizing virtualized assets. The example system shown in FIG. 9 includes a computer-readable medium 902, a virtual asset utilization system 904, and a virtualized asset provisioning system 906. In the example system shown in FIG. 9, the virtual asset utilization system 904 and the virtualized asset provisioning system 906 are coupled to each other through the computer-readable medium 902.

The virtual asset utilization system 904 functions to exploit a virtualized asset. In a specific implementation, the virtualized asset is a stream-enabled asset that can be executed at the virtual asset utilization system 904 without being installed thereon. In this paper, execution describes the process by which a computer or virtual machine performs instructions of a program to trigger sequences of simple actions on the executing machine. These actions produce effects according to the semantics of the instructions in the program. Programs typically contain implicit and explicit assumptions about resources available at the time of execution. Most programs execute with the support of an operating system and runtime libraries specific to the source language that provide crucial services not supplied directly by the processor(s). For a virtualized application to function properly, the virtual asset utilization system 904 must accommodate the virtualized asset by providing, or "tricking" the virtualized asset into acting as if the virtual asset utilization system 904 has provided, the applicable crucial services.

One aspect of applications (as opposed to streaming media) is the context in which they operate is expected to provide everything necessary to run, and in particular any self-referential branches within the application itself. For example, if a first portion of a virtualized asset that is part of an application is running on the virtual asset utilization system 904, the virtual asset utilization system 904 can make it appear that all self-referential branches of the application can be accommodated even if a second portion of the virtualized asset is a self-referential branch destination, but is neither being executed at the virtual asset utilization system 904 (e.g., it is not in memory or non-volatile storage at the virtual asset utilization system 904) nor is it being remotely executed.

Depending upon implementation-specific or other considerations, the virtual asset utilization system 904 can exploit the virtualized asset after a portion of the virtualized asset is received and stored locally at the virtual asset utilization system 904. For example, portions of a virtualized asset can be cached at the virtual asset utilization system 904. Local cache memory can be updated as new virtualized assets or portions of virtualized assets are received and stored in the cache memory. For example, updating the cache can include deleting old assets or portions of assets from the cache. The old assets or portions of assets can be deleted based upon the length of time since they were last exploited. Even after old assets or portions of assets are deleted from the local cache memory, the assets or portions of assets can still appear cached to the virtual asset utilization system 904. For example, if the virtual asset utilization system 904 needs an asset or portions of an asset that were deleted from the local cache memory for virtualizing the asset at the virtual asset utilization system 904, then the asset or the portions of the asset can be resent to the virtual asset utilization system 904 and cached again.

In a specific implementation, the virtual asset utilization system 904 can begin exploiting a virtualized asset once it has received a sufficient number of portions (e.g., portions received reach or surpass an executable threshold) of the virtualized asset. The virtual asset utilization system 904 can also continue to exploit a virtualized asset by receiving additional portions of the virtualized asset that are not stored on or do not reside locally on the virtual asset utilization system 904 but are possibly needed to continue exploiting the virtualized asset.

As used herein, an "asset" can be content accessed or generated by a computer-based process. As way of example, an asset can include applications, such as games, document-based applications (e.g., word processing or spreadsheet applications), operating systems, image-related applications, multimedia players, and the like. Assets could also include data, such as movies, music, electronic books, newspapers, and magazines, and other data store content.

As understood herein, a "stream-enabled asset" is an asset (e.g., conventionally-coded application) that at least in part, is broken into portions (e.g., blocks, chunks, pages, etc.), such that the asset can be streamed on a per-portion basis to the virtual asset utilization system 904. Of particular interest are self-referential stream-enabled assets. Self-referential stream-enabled assets are at least in part non-sequential because they do not necessarily run in sequence like streaming media, but can rather branch from one location within the instructions of the self-referential stream enabled asset to another that comes "before" (as measured in time received or in the organization of the instruction set) or "skips ahead" (as measured from the time an applicable portion was received or later in the organization of the instruction set). Virtualized assets of particular interest are also self-referential, but need not be stream-enabled. Specifically, a virtualized asset can request pages on an ad hoc basis, as opposed to having pages predictively streamed while the virtualized asset is being instantiated or executed at the virtual asset utilization system 904.

In a specific implementation, the assets or portions of the assets are stored as compressed data in order to reduce the amount of bandwidth that is required to stream the assets or portion of the assets to the virtual asset utilization system 904. This is of particular importance in bandwidth-constrained environments, such as wireless. Depending upon implementation- and application-specific considerations, even a broadband connection can be a constraint that increases the desirability of compressing data. This is also of particular importance for space-constrained clients, such as low-cost Internet of Things (IoT) devices that are sometimes little more than sensors with a very small memory and/or NV storage capacity.

In a specific implementation, the assets or the portions of the assets are stored as encrypted data. Advantageously, virtualized applications need not be provided in their entireties to a client, which can protect against piracy. In addition, it may be desirable only to encrypt certain portions of a virtualized asset or encrypt a first portion of a stream enabled application using a first encryption protocol and a second portion of a stream enabled application using a second encryption protocol. Such a technique is available even for two self-referential (from the perspective of the application) portions, which results in per-page differentiated encryption.

Depending upon implementation-specific or other considerations, a portion of a virtualized application can be an artifact of executing a portion of a virtualized application remote at the virtual asset utilization system 904. For example, a portion of a virtualized application can be a data structure created or modified by executing a file, a portion of a stream-enabled application, or using the stream-enabled application.

The virtualized asset provisioning system 906 functions to provide remote portions of virtualization-enabled assets to the virtual asset utilization system 904. In various implementations, at least a portion of a virtualized asset provisioning system 906 can be implemented as part of the virtual asset utilization system 904. For example, at least a portion of a virtualized asset provisioning system 906 can be implemented as part of a kernel of the virtual asset utilization system 906. In various implementations, the virtualized asset provisioning system 906 can determine if portions of virtualized assets are stored locally at the virtual asset utilization system 906 or are stored remotely from the virtual asset utilization system 906 and subsequently provide remotely stored portions of the virtual asset to the virtual asset utilization system 906.

In a specific implementation, the virtualized asset provisioning system 906 can provide to the virtual asset utilization system 904 results of executing portions of a virtualized asset (i.e., executed remotely relative to the virtual asset utilization system 904). For example, the virtualized asset provisioning system 906 can generate results of executing files of a steam-enabled asset using a corresponding asset at a remote location from the virtual asset utilization system 904, and provide the results to the virtual asset utilization system 904. For example, artifacts derived from portions of a virtualized asset can be provided in lieu of the applicable portions of the virtualized asset, thereby potentially eliminating the need to send the portions of the virtualized asset responsible for generating such artifacts to the virtual asset utilization system 904.

In a specific implementation, the virtualized asset provisioning system 906 functions to spoof contents of a directory of the virtual asset utilization system 904. In various implementations, the virtualized asset provisioning system 906 can return portions of a virtualized asset to the virtual asset utilization system 904, whereby the entire asset does not reside at the virtual asset utilization system but appears to reside in its entirety as pertinent portions of the file are provided to the virtual asset utilization system.

In a specific implementation, the virtualized asset provisioning system 906 functions to maintain a resource map for remote portions of virtualized assets to virtual asset utilization systems and use resource maps to remote portions of virtualized assets. A resource map can include location information of available assets and portions of available assets. The location information can include physical addresses or uniform resource locators (hereinafter URLs) of the assets and portions of assets and logical addresses of the assets and portions of assets. The physical addresses can represent physical locations on the virtual asset utilization system or physical locations remote from the virtual asset utilization system. The location information can also include the directories or subdirectories in which a portion of the asset resides. Additionally, the location information can include the logical address of the portions of the assets, including the portions of the virtualized assets. In various implementations, a resource map can map specific manners in which an asset can be exploited and a portion or portions of a virtualized asset corresponding to the asset used in exploiting the asset in the specific manners. For example, a resource map can include a map of portions of a virtualized asset that are executed to cause execution of a level in a game.

In a specific implementation, the virtualized asset provisioning system 906 functions to maintain a virtual file map included as part of resource maps for obtaining portions of virtualized assets to virtual asset utilization systems. A virtual file map can include a map identifying portions of a file that are needed to exploit a virtualized asset in specific manners. Depending upon implementation-specific or other considerations, a virtual file map can include a map to an artifact of executing a file or portions of a file remotely from the virtual asset utilization system. For example, a virtual file map can include a map indicating an artifact of executing a portion of a file representing a portion of a level in a virtualized game using the corresponding game at a remote location from the virtual asset utilization system. Further depending upon implementation-specific or other considerations, a virtual file map can include a mapping of specific manners in exploiting a virtualized asset to portions of a file of the virtualized asset for exploiting the virtualized asset according to the specific manners. For example, a virtual file map can include a map of moving a character in a game to a specific point in a level and the specific portions of a file needed for execution to move the character in the game to the specific point. In various implementations, the virtualized asset provisioning system 906 can use a virtual file map to provide results of executing portions of a file or a file, or to provide portions of a file to the virtual asset utilization system, for purposes of virtualizing, at the virtual asset utilization system, a file for use in exploiting a virtualized asset.

In a specific implementation, the virtualized asset provisioning system 906 functions to maintain location information, as part of resource maps, in part like a translation lookaside buffer (hereinafter TLB). Specifically, the TLB can include a map of logical addresses of assets or portions of assets and the corresponding physical addresses of assets or portions of assets. The TLB can be searched by looking up a logical address of an asset or portions of an asset and returning the physical address of the asset or portion of an asset if a match is found to the logical address. Additionally, if the physical address of an asset or a portion of an asset changes, the TLB can be updated, by the virtualized asset provisioning system 906, to reflect the change in the physical address.

In a specific implementation, the virtualized asset provisioning system 906 functions to remote page portions of virtualized assets to the virtual asset utilization system using instances of the virtual asset utilization system. Each instance can be a map of all of the assets that are available the specific virtual asset utilization system. Specifically, the instance can include metadata that identifies the available assets. A virtualized asset can be available to a specific virtual asset utilization system, if the virtual asset utilization system is authorized to exploit the asset, e.g. if the virtual asset utilization system has a license to use the asset. For example, if a streaming client has purchased the right to use an application, then the application, as an asset, is available as a virtualized asset. An instance can include an access control token that allows the virtual asset utilization system to access an available asset, wherein portions of a virtualized asset are provided in accordance with the access control token.

In a specific implementation, the virtualized asset provisioning system 906 functions to maintain instances of virtual asset utilization systems including asset identification information. Depending upon implementation-specific or other considerations, asset identification information can include whether an asset is a virtualized asset. Further depending upon implementation-specific or other considerations, asset identification information can be used in the retrieval of the portions of an asset, including the virtualized asset. For example, if it is known that an asset is a virtualized asset, such information can be used to determine that some or all of the portions of the virtualized asset are stored or reside on systems or datastores that are remote from virtual asset utilization systems.

In a specific implementation, the virtualized asset provisioning system 906 functions to maintain instances including state information of virtual asset utilization systems. Depending upon implementation-specific or other considerations, state information can include what assets are being exploited by a specific virtual asset utilization system at the time the instance is created. Further depending upon implementation-specific or other considerations, state information can also include how the assets are being exploited by a specific virtual asset utilization system. For example, state information can include which assets are being displayed through a user interface associated with the virtual asset utilization system. In various implementations, state information can be a snapshot of all of the assets that are open on a user interface associated with a specific virtual asset utilization system and how those assets are displayed on the user interface. State information can be used as a mechanism for data recovery. Specifically, in the event of a catastrophic failure or crash of the virtual asset utilization system, the state information can be used to restore the state of the virtual asset utilization system to the state that existed on the virtual asset utilization system before the catastrophic failure or crash.

In a specific implementation, the virtualized asset provisioning system 906 functions to maintain instances including asset history information. Depending upon implementation-specific or other considerations, asset history information can include what assets have been exploited by the virtual asset utilization system during a period of time. Further depending upon implementation-specific or other considerations, asset history information can be used to create asset association information, which can be included as part of the instance. Asset association information can include information about the degree to which different virtualized assets or portions of virtualized assets are related. Specifically, the degree to which assets or portions of assets are related can be based upon whether assets are exploited together or within a specific or close amount of time. For example, if the virtual asset utilization system runs a first application and immediately runs a second application after running the first application, then the degree to which the asset of or associated with the first application is related to the asset of or associated with the second application is high. The degree of relation between assets can be determined through any relational algorithm or determination method and can be expressed through any assessment mechanism or value, e.g. a relation score.

In a specific implementation, the virtualized asset provisioning system 906 functions to maintain instances including information about the characteristics of the virtual asset utilization systems that exploit specific assets. Depending upon implementation specific or other considerations, characteristics of the virtual asset utilization system can include information about the users of the virtual asset utilization system and the geographical locations of the virtual asset utilization systems that exploit a specific asset. For example, if a user continuously uses the same assets, the characteristics can include the identification of the assets that the user constantly uses. In another example, if users in a certain geographical region read a specific section of a digital newspaper, then the asset association information can include data that relates all virtual asset utilization systems that are used within the geographical region to the specific section of the digital newspaper. Further depending upon implementation-specific or other considerations, asset association information can be used to retrieve and push specific assets or portions of assets to the virtual asset utilization system before the virtual asset utilization systems generate and send out requests for the specific assets or portions of assets. For example, if the virtual asset utilization system begins to run a first application, a second application that is associated with the first application, as can be determined from the asset association information, can be retrieved and portions of the second application can be pushed to the virtual asset utilization system before the virtual asset utilization system generated requests for the second application.

In a specific implementation, the virtualized asset provisioning system 906 functions to maintain instances including information about an order of portions of stream-enabled assets which includes an order in which the portions of the stream-enabled assets are used in exploiting an asset in specific manners. Information about an order of portions of stream-enabled assets can be generated based upon an order in which the portions of the stream-enabled assets are sent to the virtual asset utilization system in exploiting an asset in specific manners.

In a specific implementation, the virtualized asset provisioning system 906 functions to maintain an instance unique for the virtual asset utilization system 904. As a result, an instance can contain information only related to a single virtual asset utilization system. In various implementations, an instance can be created for a given virtual asset utilization system at any time. In one implementation, instances can be created for a given virtual asset utilization system after the occurrence of a specific event. For example, a new instance can be created for a specific virtual asset utilization system whenever a new asset becomes available to the virtual asset utilization system. In another example, an instance can be created when a specific virtual asset utilization system has purchased the right to use a given asset. In yet another example, an instance can be created whenever the virtual asset utilization system begins exploiting an available asset.

In a specific implementation, the virtualized asset provisioning system 906 functions to maintain instances including time stamps that signify when each instance was created. In various implementations, timestamps can be used to restore the virtual asset utilization system to a specific state that existed at a certain time. For example, timestamps of instances can be used to restore the virtual asset utilization system 904 to a state that the virtual asset utilization system was in at any time an instance was created. In various implementations, timestamps can also be used to determine at what times assets became available to the virtual asset utilization system, and/or for how long the assets were made available to the virtual asset utilization system.

In a specific implementation, the virtualized asset provisioning system 906 functions to intercept requests for portions of virtualized asset at the virtual asset utilization system 904 for purposes of obtaining portions of the virtualized asset to the virtual asset utilization system. In various implementations, the virtualized asset provisioning system 906 can generate a stub at the virtual asset utilization system corresponding to an intercepted request. A portion of the virtualized asset provisioning system 906 implemented as part of a kernel at the virtual asset utilization system can functions to intercept a request for a portion of a virtualized asset and insert a stub at the virtual asset utilization system corresponding to the requested virtual asset utilization system. A stub, as used herein, is a nominal file of a small size. A stub, for the purposes, of this paper, functions as a low cost stand in for a real file in that it uses less storage space then a real file. As a result, through the use of a stub, files can be virtualized on client devices with very little memory space, such as an ultra-thin client device.

In a specific implementation, the virtualized asset provisioning system 906 functions to use a stub to remote page virtualized assets to the virtual asset utilization system. In using a stub, the virtualized asset provisioning system 906 can trick the virtual asset utilization system into believing that a portion of a virtualized asset resides at the virtual asset utilization system, while, an intercepted request is used to remap, at a remote location in various implementations, indexes to portions of virtualized assets. In various implementations, indexes can be used to directly provide blocks by serving as a Domain Name Service like lookup table. Further, in various implementations, indexes for portions of virtualized assets are centralized at a single system or group of systems. Depending upon implementation-specific or other considerations, an intercepted request is used by the virtualized asset provisioning system 906 to remap indexes to portions of virtualized assets located on the virtual asset utilization system. Further depending upon implementation-specific or other considerations, an intercepted request is used by the virtualized asset provisioning system 906 to remap indexes to portions of virtualized assets location remote from the virtual asset utilization system. For example, an intercepted request can be remapped by the virtualized asset provisioning system 906 to a portion of a file stored remotely from the virtual asset utilization system.

In a specific implementation, the virtualized asset provisioning system 906 functions to use resource maps to remap indexes as part of obtaining portions of virtualized assets to the virtual asset utilization system. For example, the virtualized asset provisioning system 906 can use a resource map to remap an index to a portion of a file that is a subject of a request. Further in the example, the virtualized asset provisioning system 906 can provide the portion of the file to the virtual asset utilization system, while the file in its entirety remains off of the virtual asset utilization system, thereby virtualizing file, using a resource map, e.g. a virtual file map.

In a specific implementation, the virtualized asset provisioning system 906 functions to maintain a cloud workspace for use in remote paging virtualized assets to the virtual asset utilization system. As used in this paper, "remote paging" is a specific example of a mechanism for provisioning portions of, e.g., virtualized assets to a virtual asset utilization system, for the purposes of provisioning the virtualized asset to a device. Remote paging of resources in the cloud can be referred to as "cloud paging." A cloud workspace is a remote storage location storing specific portions of virtualized asset that can be modified differently from an original copy of the virtualized assets. The virtualized asset provisioning system 906 can access a cloud workspace to retrieve modified portions of virtualized assets and provide them to the virtual asset utilization system. Depending upon implementation-specific or other considerations, a cloud workspace can be specific to a user or the virtual asset utilization system. For example, a cloud workspace can be used to remote page a virtualized asset to a user utilizing different virtual asset utilization systems, while maintaining a state of the virtualized asset for the user. In various implementations, a cloud workspace can be maintained using instances. For example, if a cloud workspace crashes, the virtualized asset provisioning system 906 can restore the cloud workspace using an instance of the virtual asset utilization system.

In an example of operation of the example system shown in FIG. 9, the virtualized asset provisioning system 906 intercepts a request for a portion of a file of a virtualized asset at the virtual asset utilization system 904. In the example of operation of the example system shown in FIG. 9, the virtualized asset provisioning system 906 installs a stub at the virtual asset utilization system 904 in response to intercepting the request. Further, in the example of operation of the example system shown in FIG. 9, the virtualized asset provisioning system 906 uses the intercepted request to map an index to a location remote from the virtual asset utilization system 904 where the portion of file is located using a resource map. In the example of operation of the example system shown in FIG. 9, the virtualized asset provisioning system 906 provides the portion of the file to the virtual asset utilization system 904.

Figure 10:
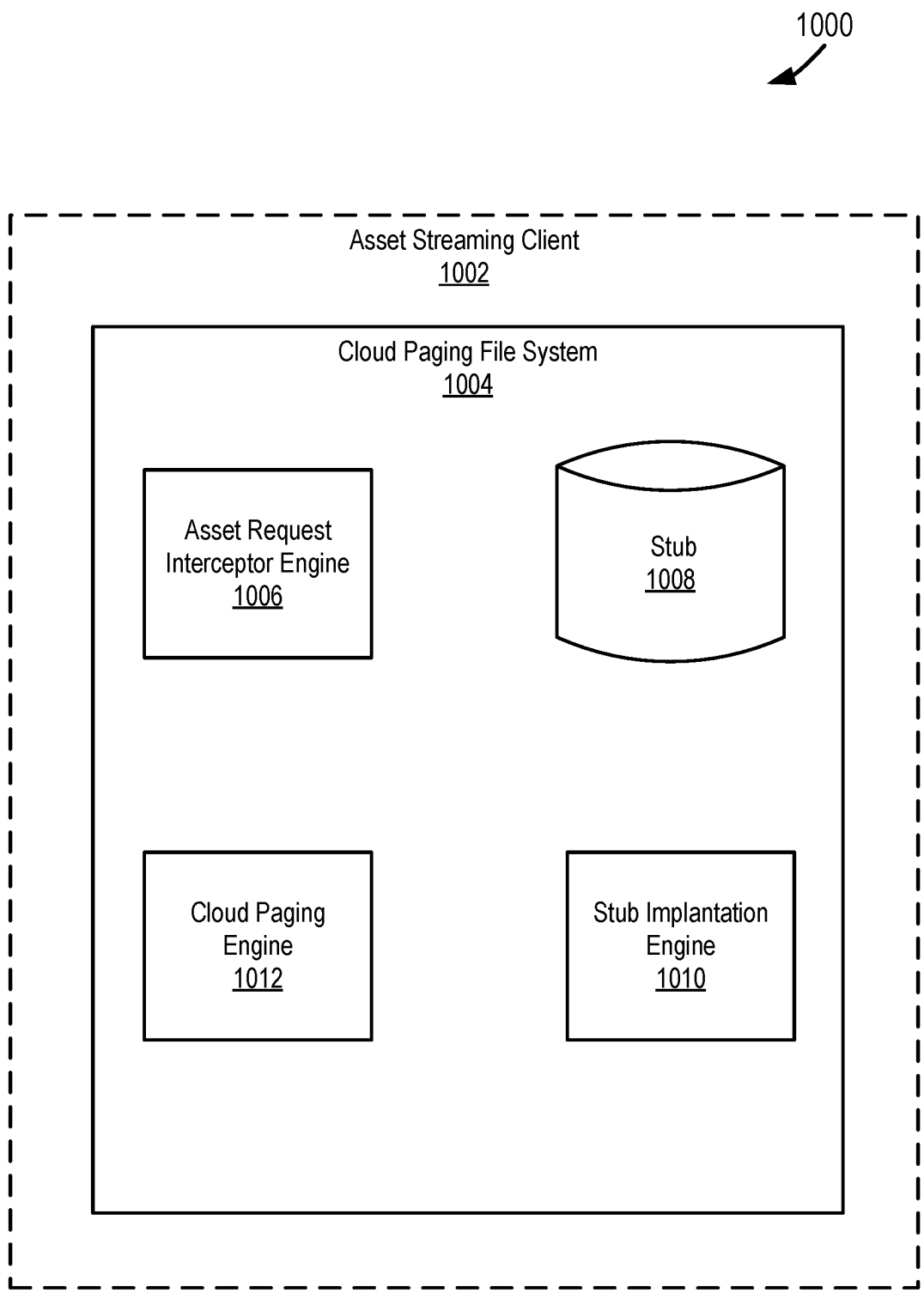
FIG. 10 depicts a diagram of an example of a remote paging file subsystem implemented at the virtual asset utilization system.

FIG. 10 depicts a diagram 1000 of an example of a remote paging file subsystem 1004 implemented at the virtual asset utilization system 1002. The virtual asset utilization system 1002 functions according to an applicable device for utilizing virtualized assets, using techniques described with reference to the virtual asset utilization system 904. The virtual asset utilization system 1002 can be implemented on a thin client or an ultra-thin client, on a mobile device, and/or on some other applicable platform. The virtual asset utilization system 1002 can include specific purpose hardware for executing virtualized assets. The virtual asset utilization system 1002 can include interfaces (not shown) through which a user can exploit virtualized assets.

In a specific implementation, the remote paging file subsystem 1004 is implemented, at least in part, as part of a kernel of the virtualized asset utilization system 1002. The remote paging file subsystem 1004 can intercept requests for portions of virtualized assets and provide the intercepted requests for purposes of remote paging the virtualized assets. For example, the remote paging file subsystem 1004 can intercept a request for a file of a virtualized asset and handle the request. The remote paging file subsystem 1004 can implant a stub in response to intercepting a request to trick the virtual asset utilization system that a portion of a virtualized asset does actually reside at the virtual asset utilization system when it is actually virtualized at the virtual asset utilization system. In various implementations, the remote paging file subsystem 1004 can intercept and provide data for writing to a portion of a virtualized asset and/or a pointer to a location in the virtualized asset where the data should be written. For example, the remote paging file subsystem 1004 can intercept a request to write to a file of a virtualized asset and provide data and a pointer indicating what and where to write in the file.

The remote paging file subsystem 1004 shown in FIG. 10 includes an asset request interceptor engine 1006, a stub datastore 1008, a stub implantation engine 1010, and a remote paging engine 1012. The asset request interceptor engine 1006 functions to intercept a request for purposes of remote paging a portion of a virtualized asset. Depending upon implementation-specific or other considerations, the asset request interceptor engine 1006 can intercept a request for a portion of a virtualized asset. Further depending upon implantation-specific or other considerations, the asset request interceptor engine 1006 can intercept a request to exploit a virtualized asset in a specific manner. For example, the asset request interceptor engine 1006 can intercept a request to move a player to a specific position in a game. Depending upon implementation-specific or other considerations, the asset request interceptor engine 1006 can intercept a request of data to write to a portion of a virtualized asset and/or a pointer to a location in the virtualized asset where the data should be written.

In a specific implementation, the asset request interceptor engine 1006 is implemented, at least in part, through a file system hook. Depending upon implementation-specific or other considerations, the asset request interceptor engine 1006 is implemented as a file system hook operatively interposed between a file system manager and a file system driver of the virtual asset utilization system. The file system hook is configured to detect a file system call corresponding to a target application and invoking one or more procedures. Examples of invoked procedures include accessing data at a server terminal operatively coupled to the target device via a data network (such as the Internet) or at a locally connected computer readable storage medium. In various implementations, an agent procedure also executes on virtual asset utilization system to configure the file system hook for executing the target application.

The stub datastore 1008 functions to store stubs for insertion based on intercepted requests for remote paging to the virtual asset utilization system. Stubs stored in the stub datastore 1008 can be specific to a type of request. For example, a stub for a request to files in a first application can be different from a stub for a request to files in a second application. The stub datastore 1008 can store stub data including a stub and an indication of specific requests for which to implant specific stubs.

In a specific implementation, the stub implantation engine 1010 implants a stub in response to an interception of a request. In using a stub, the virtual asset utilization system can be tricked into thinking that a portion of a virtualized asset resides at the virtual asset utilization system while an intercepted request is used to remap, at a potentially remote location, indexes to portions of virtualized assets. In various implementations, the stub implantation engine 1010 can remove an implanted stub once a request has been satisfied through the providing of a virtualized asset. The stub implantation engine 1010 can select a specific stub based on characteristics of a request to which it is responding. For example, the stub implantation engine 1010 can select a stub for use with a specific application if a request is made for a portion of a file of the specific application. In another example, the stub implantation engine 1010 can select a stub that is for use with a specific file type if the intercepted request is for a file of the specific file type.

The remote paging engine 1012 functions to send and receive data for use in remote paging virtualized assets at the virtual asset utilization system. In various implementations, the remote paging engine 1012 can send a request for use in remote paging a portion of a virtualized asset to the virtual asset utilization system. For example, the remote paging engine 1012 can send a request for a portion of a file. In various implementations, the remote paging engine 1012 can send a request to write to a file of a virtualized asset and provide data and a pointer indicating what and where to write in the file. For example, the remote paging engine 1012 can send data to write to a file of a virtualized asset. In various implementations, the remote paging engine 1012 can receive a portion of a virtualized asset. The remote paging engine 1012 can provide a received portion of a virtualized asset to an applicable system, such as a file system at the virtual asset utilization system, for use in exploitation of the virtualized asset at the virtual asset utilization system. The remote paging engine 1012 can receive a portion of a virtualized asset in response to a sent request for the portion of the virtualized asset.

In a specific implementation, the remote paging engine 1012, in addition to remote paging, functions to retrieve locally-available portions of virtualized assets. In various implementations, the remote paging engine 1012 can retrieve a locally stored portion of a virtualized asset in response to a received instruction indicating that a portion of a virtualized asset is stored locally. For example, if a file of a virtualized asset is locally available at the virtual asset utilization system, and the remote paging engine 1012 receives an instruction indicating that the file is stored locally, then the remote paging engine 1012 can retrieve the locally-available portion of the file. In various implementations, the remote paging engine 1012 can determine a portion of a virtualized asset is stored locally and subsequently retrieve the portion of the virtualized asset. For example, the remote paging engine 1012 can determine that a file of a virtualized asset is locally stored at the virtual asset utilization system and subsequently retrieve a portion of the file. The remote paging engine 1012 can provide a locally stored portion of a virtualized asset to an applicable system, such as a file system at the virtual asset utilization system, for use in exploitation of the virtualized asset at the virtual asset utilization system.

In an example of operation of the example system shown in FIG. 10, an automated agent of the asset request interceptor engine 1006 intercepts a request for a portion of a virtualized asset. In the example of operation of the example system shown in FIG. 10, an automated agent of the stub implantation engine 1010 implants a stub based on the request using stub data stored in the stub datastore 1008. Further, in the example of operation of the example system shown in FIG. 10, an automated agent of the remote paging engine 1012 forwards the intercepted request to a location remote from the virtual asset utilization system 1002 and receives the portion of the virtualized asset from a location remote from the virtual asset utilization system 1002. In the example of operation of the example system shown in FIG. 10, an automated agent of the remote paging engine 1012 provides the received portion of the virtualized asset for use in continued exploitation of the virtualized asset virtualized at the virtual asset utilization system 1002. In a specific implementation, a portion of a stream-enabled asset can be provided to the virtual asset utilization system 1002 in advance of a request, which enables the virtual asset utilization system 1002 to access the portion from a local cache. Even in an implementation of a virtualized asset that is not stream-enabled, a previously requested portion of the virtualized asset can be retained in cache and accessed locally thereafter.

Figure 11:
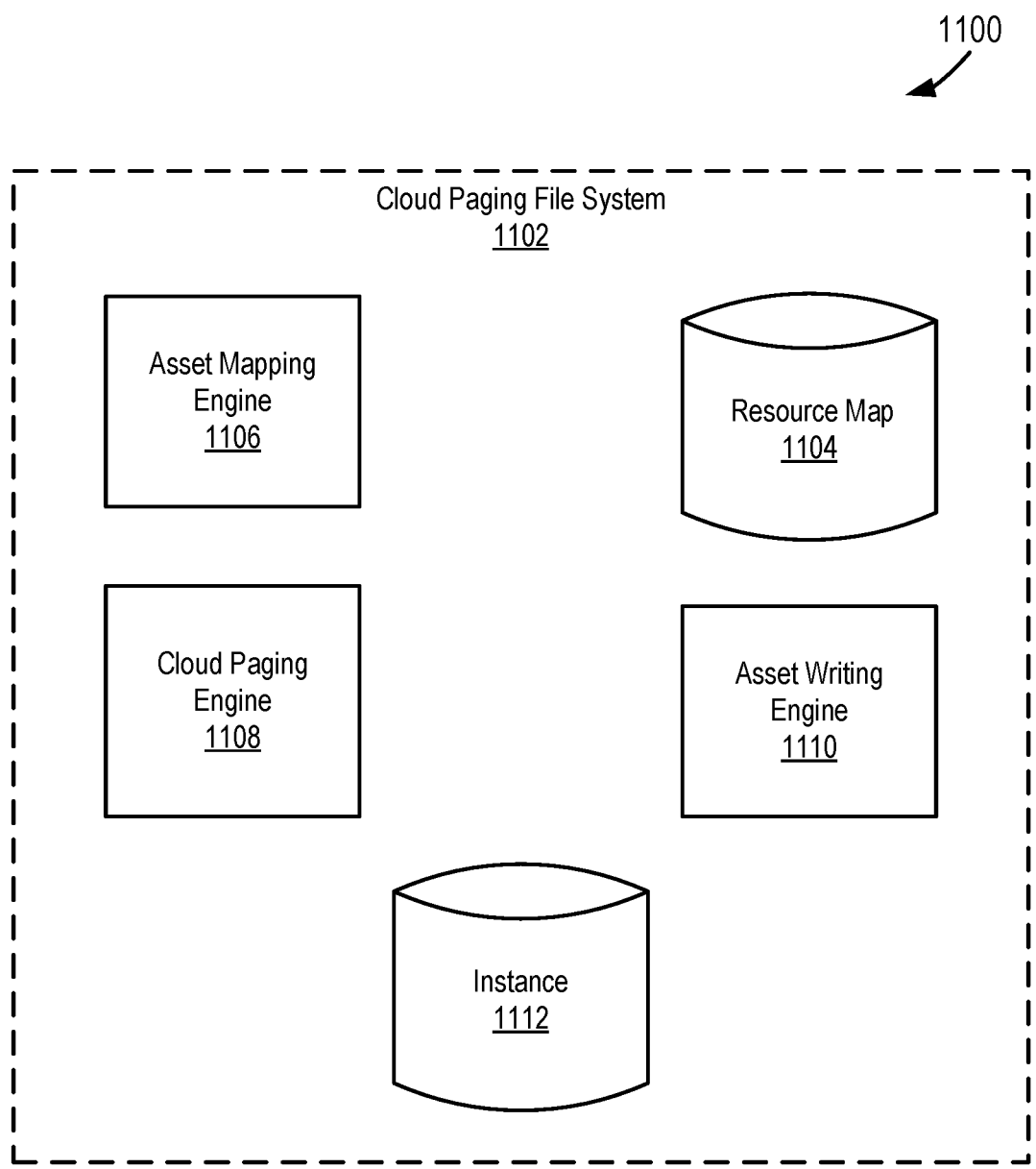
FIG. 11 depicts a diagram of an example of a system for remote paging virtualized assets.

FIG. 11 depicts a diagram 1100 of an example of a system for remote paging virtualized assets The example system shown in FIG. 11 includes a remote paging file system 1102. The remote paging file system 1102 functions according to an applicable system for remote paging portions of virtualized assets to the virtual asset utilization system, such as the remote paging file systems described in this paper. In a specific implementation, the remote paging file system 1102 maps a portion of a virtualized asset to a physical location of the portion of a virtualized asset. The remote paging file system 1102 can map a portion of a virtualized asset to a physical location of the virtualized asset in response to a request for the virtualized asset. In various implementations, the remote paging file system 1102 can retrieve a portion of a virtualized asset from a location remote from the virtual asset utilization system and subsequently return the portion of the virtualized asset to a client. Portions of the remote paging file system 1102 can be implemented remote from an assets streaming client, e.g. at an asset streaming server.

The example remote paging file system 1102 shown in FIG. 11 includes a resource map datastore 1104, an asset mapping engine 1106, a remote paging engine 1108, an asset writing engine 1110, and an instance datastore 1112. The resource map datastore 1104 functions to store resource map data indicating resource maps for use in mapping assets to physical locations at which the assets reside. Resource maps stored in the resource map datastore 1104 can include location information including physical addresses or URLs of the assets and portions of assets and logical addresses of the assets and portions of assets. Depending upon implementation-specific or other considerations, physical addresses can represent physical locations on the virtual asset utilization system or physical locations remote from the virtual asset utilization system. In various implementations, a resource map stored in the resource map datastore 1104 can map specific manners in which an asset can be exploited and a portion or portions of a virtualized asset corresponding to the asset used in exploiting the asset in the specific manners. For example, a resource map can include a map of portions of a virtualized asset that are executed to cause execution of a level in a game.

In a specific implementation, the resource map datastore 1104 functions to store resource map data indicating a virtual file map for use in remote paging portions of virtualized assets to clients. Depending upon implementation-specific or other considerations, a virtual file map indicated by resource map data stored in the resource map datastore 1104 can include a map to a result of executing a file or portions of a file remotely from the virtual asset utilization system. For example, a virtual file map can include a map indicating a result of executing a portion of a file representing a portion of a level in a steam-enabled game using the corresponding game at a remote location from the virtual asset utilization system. Further depending upon implementation-specific or other considerations, a virtual file map indicated by resource map data stored in the resource map datastore 1104 can include a mapping of specific manners in exploiting a virtualized asset to portions of a file of the virtualized asset for exploiting the virtualized asset according to the specific manners. For example, a virtual file map can include a map of moving a character in a game to a specific point in a level and the specific portions of a file needed for execution to move the character in the game to the specific point.

In a specific implementation, resource map data stored in the resource map datastore 1104 is stored, at least in part, like a TLB. Specifically, the TLB can include a map of logical addresses of assets or portions of assets and the corresponding physical addresses of assets or portions of assets. The TLB can be searched by looking up a logical address of an asset or portions of an asset and returning the physical address of the asset or portion of an asset if a match is found to the logical address. Additionally, if the physical address of an asset or a portion of an asset changes, the TLB can be updated to reflect the change in the physical address.

The asset mapping engine 1106 functions to map an intercepted request to a physical location of a portion of a virtualized asset. The asset mapping engine 1106 can map an intercepted request to a portion of a virtualized asset using a resource map. For example, the asset mapping engine 1106 can identify a requested portion of a virtualized asset from an intercepted request and determine a physical location of the portion of the virtualized asset using a resource map. Depending upon implementation-specific or other considerations, the asset mapping engine 1106 can map an intercepted request to a physical location of a portion of a virtualized asset remote from the virtual asset utilization system. For example, the asset mapping engine 1106 can map an intercepted request for a portion of a file in a game to an asset streaming server remote from the virtual asset utilization system. Further depending upon implementation-specific or other considerations, the asset mapping engine 1106 can map an intercepted request to a physical location of a portion of a virtualized asset at the virtual asset utilization system. For example, the asset mapping engine 1106 can map an intercepted request for a portion of a file in a game to a physical location at the virtual asset utilization system. In various implementations, the asset mapping engine 1106 can map a request for a portion of a virtualized asset to a physical location remote from the virtual asset utilization system or a physical location at the virtual asset utilization system.

In a specific implementation, the asset mapping engine 1106 functions to map an intercepted request to a physical location of a portion of a virtualized asset using a virtual file map. Depending upon implementation-specific or other considerations, the asset mapping engine 1106 can use a virtual file map to map an intercepted request to a result of executing a file or portions of a file remotely from the virtual asset utilization system. For example, the asset mapping engine 1106 can use a virtual file map to map an intercepted request for a portion of a level to a result of executing a portion of a file representing the portion of the level in a steam-enabled game using the corresponding game at a remote location from the virtual asset utilization system. Further depending upon implementation-specific or other considerations, the asset mapping engine 1106 can use a virtual file map to map a request for specific manners in exploiting a stream-asset to portions of a file of the virtualized asset for exploiting the virtualized asset according to the specific manners. For example, the asset mapping engine 1106 can use a virtual file map to map a request for moving a character in a game to a specific point in a level to the specific portions of a file needed for execution to move the character in the game to the specific point.

The remote paging engine 1108 functions to send and receive data for use in remote paging portions of virtualized assets to the virtual asset utilization system. In various implementations, the remote paging engine 1108 can receive requests for portions of virtualized assets intercepted at the virtual asset utilization system. For example, the remote paging engine 1108 can receive a request for a portion of a file intercepted at the virtual asset utilization system. Depending upon implementation-specific or other considerations, the remote paging engine 1108 can retrieve a portion of a virtualized asset and provide the portion of the virtualized asset. The remote paging engine 1108 can retrieve a portion of a virtualized asset based on a mapping of a request for the virtualized asset to a physical location. For example, the remote paging engine 1108 can use a mapping to retrieve a portion of a virtualized asset from a physical location remote from the virtual asset utilization system, and subsequently provide the portion of the virtualized asset to the virtual asset utilization system.

In a specific implementation, the remote paging engine 1108 can determine that a portion of a virtualized asset, which is a subject of an intercepted request, actually resides at a physical location at the virtual asset utilization system. In various implementations, the remote paging engine 1108 can determine that a portion of a virtualized asset actually resides at a physical location at the virtual asset utilization system based on a mapping of an intercepted request to the physical location at the virtual asset utilization system. In response to determining a portion of a virtualized asset which is a subject of an intercepted request, actually resides at the virtual asset utilization system, the remote paging engine 1108 can send instructions/notifications to the virtual asset utilization system indicating that the portion of the virtualized asset resides at the virtual asset utilization system.

In a specific implementation, the remote paging engine 1108 can send and receive data for remote paging portions of a virtualized asset to the virtual asset utilization system using an instance of the virtual asset utilization system. Depending upon implementation-specific or other considerations, the remote paging engine 1108 can determine whether the virtual asset utilization system or a user of the virtual asset utilization system has access rights to a virtualized as set before paging a portion of the virtualized asset to the virtual asset utilization system. For example, if the virtual asset utilization system is requesting a level of a game, then the remote paging engine 1108 can determine if the virtual asset utilization system has access rights to the game, and subsequently send files of the level of the game to the virtual asset utilization system if it determines that the virtual asset utilization system has access rights to the game. In various implementations, the remote paging engine 1108 can maintain, at least in part, an instance. For example, if the virtual asset utilization system obtains access rights to an asset, then the remote paging engine 1108 can update an instance of the virtual asset utilization system to indicate that the virtual asset utilization system has access rights to the asset. Further depending upon implementation-specific or other considerations, the remote paging engine 1108 can update an instance to reflect what portions of virtualized assets have been remote paged to the virtual asset utilization system.

The asset writing engine 1110 functions to write to a portion of a virtualized asset. In various implementations, the asset writing engine 1110 can write to a portion of a virtualized asset physically stored at a location remote from the virtual asset utilization system. For example, the asset writing engine 1110 can write to a portion of a virtualized asset stored in a cloud workspace uniquely associated with a user and/or the virtual asset utilization system. The asset writing engine 1110 can write to a portion of a virtualized asset in response to an intercepted request to write to the portion of the virtualized asset. For example, the asset writing engine 1110 can write to a portion of a virtualized asset using data indicating what to write to the portion of the virtualized asset and/or a pointer to a location in the virtualized asset where the data should be written.

In a specific implementation, the asset writing engine 1110 functions to maintain, at least in part, instances of an virtualized asset consuming device. In maintaining an instance, the asset writing engine 1110 can update an instance to reflect when a portion of a virtualized asset has been written. Depending upon implementation-specific or other considerations, the asset writing engine 1110 can update an instance to reflect what changes were made to a portion of a virtualized asset. For example, the asset writing engine 1110 can update an instance to reflect a time when a file of a virtualized asset was written to and/or what changes were made to the file.

In an example of operation of the example system shown in FIG. 11, an automated agent of the remote paging engine 1108 receives a request for a portion of a virtualized asset intercepted at the virtual asset utilization system. In the example of operation of the example system shown in FIG. 11, an automated agent of the asset mapping engine 1106 maps the request to a physical location of the portion of the virtualized asset using a resource map stored in resource map datastore 1104. In the example of operation of the example system shown in FIG. 11, an automated agent of the remote paging engine 1108 uses a mapping of the request to determine if the physical location of the portion of the virtualized asset is at the virtual asset utilization system or remote from the virtual asset utilization system. Further, in the example of operation of the example system shown in FIG. 11, if it is determined that the physical location is remote from the virtual asset utilization system, then an automated agent of the remote paging engine 1108 can retrieve the portion of the steam-enabled asset and provide it to the virtual asset utilization system. In the example of operation of the example system shown in FIG. 11, an automated agent of the remote paging engine 1108 can update an instance stored in the instance datastore 1112 to indicate that the portion of the virtualized asset was provided to the virtual asset utilization system.

The instance datastore 1112 functions to store instance data indicating instances of virtual asset utilization systems and/or users. Instance data stored in the instance datastore 1112 can indicate which portions of virtualized assets have been provided to specific users and/or virtual asset utilization systems. In various implementations, instance data stored in the instance datastore 1112 can indicate which and/or how files of a virtualized asset have been written to for a user. For example, instance data stored in the instance datastore 1112 can indicate specific files of a game have been written to for a user. Further depending upon implementation-specific or other considerations, instance data stored in the instance datastore 1112 can indicate access control right to virtualized assets for specific users and/or virtual asset utilization systems.

Figure 12:
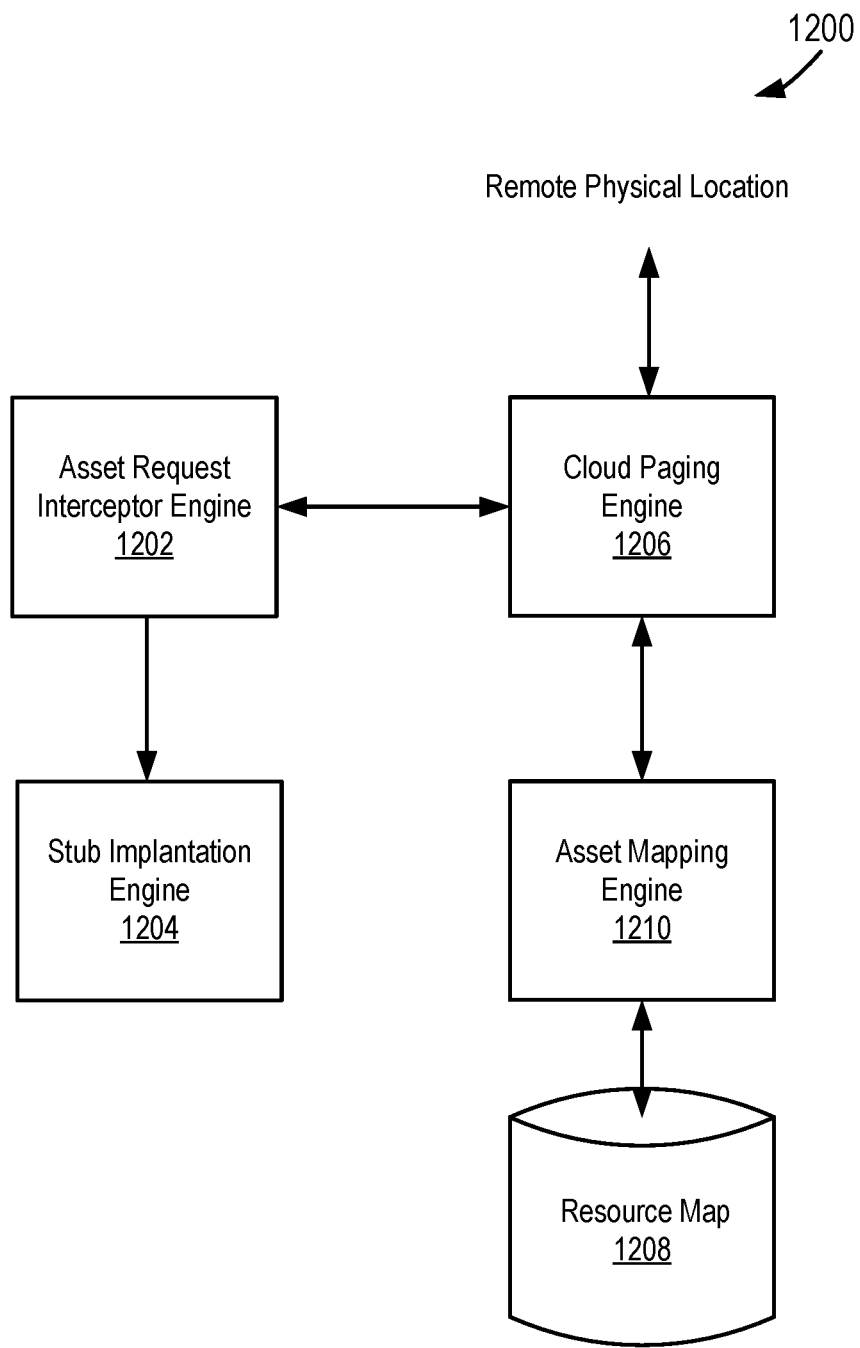
FIG. 12 depicts a diagram of an example of a system for remote paging portions of virtualized assets.

FIG. 12 depicts a diagram 1200 of an example of a system for remote paging portions of virtualized assets. The example system shown in FIG. 12 includes an asset request interceptor engine 1202, a stub implantation engine 1204, a remote paging engine 1206, a resource map datastore 1208, and an asset mapping engine 1210.

The asset request interceptor engine 1202 functions to intercept requests for portions of assets, such as the asset request interceptor engines described in this paper. The asset request interceptor engine 1202 can intercept a request for a portion of an asset for use in exploitation of the asset at the virtual asset utilization system. In various implementations, the asset request interceptor engine 1202 is implemented as part of a kernel at the virtual asset utilization system. Depending upon implementation-specific or other considerations, the asset request interceptor engine 1202 can be implemented, at least in part, through a file system hook. Further depending upon implementation-specific or other considerations, the asset request interceptor engine 1202 can be implemented as a file system hook operatively interposed between a file system manager and a file system driver of the virtual asset utilization system.

The stub implantation engine 1204 functions to implant a stub, such as the stub implantation engines described in this paper. The stub implantation engine 1204 can implant a stub at the virtual asset utilization system in response to the asset request interceptor engine 1202 intercepting the request for the asset. The asset request interceptor engine 1202 can instruct the stub implantation engine 1204 to implant a stub. The stub implantation engine 1202 can select a specific stub to implant based on characteristics of the intercepted request. For example, the stub implantation engine 1202 can select a stub for use with a specific application if the request is made for a portion of a file of the specific application. In another example, the stub implantation engine 1202 can select a stub that is for use with a specific file type if the intercepted request is for a file of the specific file type.

The remote paging engine 1206 functions to send and receive data used in remote paging portions of virtualized assets to the virtual asset utilization system, such as the remote paging engines described in this paper. In various implementations, at least a portion of the remote paging engine 1206 can be implemented remote from the virtual asset utilization system, e.g. at a streaming server. The remote paging engine 1206 can receive the request intercepted by the asset request interceptor engine 1202 from the asset requestor engine 1202.

The resource map datastore 1208 stores resource maps, such as the resource map datastores described in this paper. Resource map data stored in the resource map datastore 1208 can include location information including physical addresses or URLs of the assets and portions of assets and logical addresses of the assets and portions of assets. Depending upon implementation-specific or other considerations, resource map data stored in the resource map datastore 1208 includes resource map data indicating a virtual file map for use in remote paging portions of virtualized assets to virtual asset utilization systems. Further depending upon implementation-specific or other considerations, resource map data stored in the resource map datastore 1208 is structured as a TLB which includes a map of logical addresses of assets or portions of assets and the corresponding physical addresses of assets or portions of assets.

The asset mapping engine 1210 functions to map an intercepted request to a physical location of a portion of a virtualized asset corresponding to a requested portion of an asset, such as the asset mapping engines described in this paper. The asset mapping engine 1210 can map the intercepted request to a physical location of a portion of a virtualized asset corresponding to the portion of the asset that is the subject of the request. Depending upon implementation-specific or other considerations, a physical location of a portion of a virtualized asset can be remote from the virtual asset utilization system or at the virtual asset utilization system, however, for the purposes of the example system shown in FIG. 12, the physical location is remote from the virtual asset utilization system. The asset mapping engine can map the intercepted request to a physical location of a portion of a virtualized asset corresponding to the portion of the asset that is the subject of the request, using a resource map stored in the resource map datastore 1208.

The remote paging engine 1206 functions to retrieve the portion of the virtualized asset corresponding to the requested portion of the asset from a remote physical location based on the mapping by the asset mapping engine 1210. The remote paging engine 1206 can send the retrieved portion of the virtualized asset to the asset request interceptor engine 1202 or another applicable engine at the virtual asset utilization system, where the asset can be exploited using the portion of the virtualized asset as if the asset resides in its entirety at the virtual asset utilization system.

Figure 13:
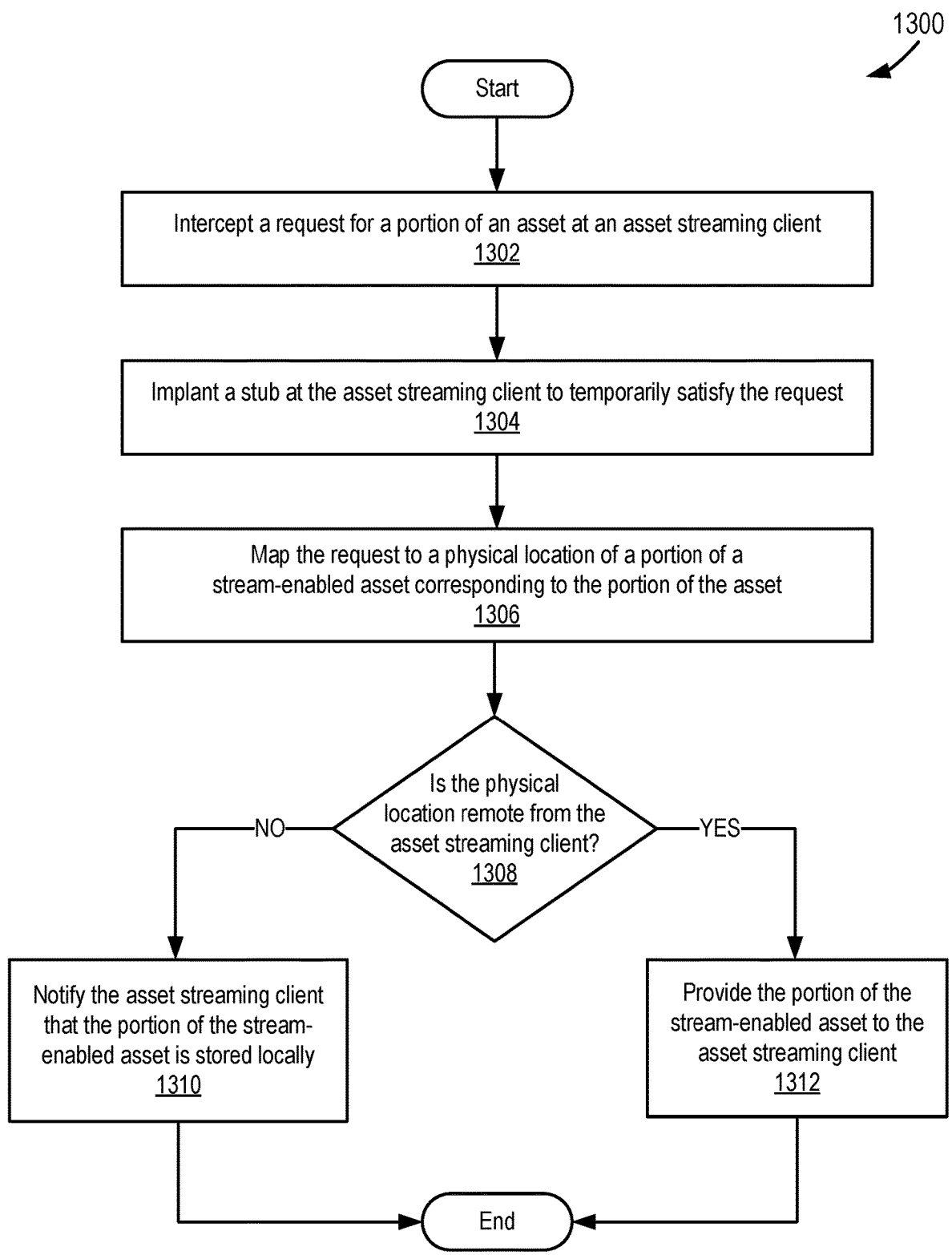
FIG. 13 depicts a flowchart of an example of a method for remote paging portions of virtualized assets.

FIG. 13 depicts a flowchart 1300 of an example of a method for remote paging portions of virtualized assets to the virtual asset utilization system device. The flowchart 1300 begins at module 1302, where a request for a portion of a virtualized asset is intercepted. An applicable engine for intercepting asset requests, such as the asset request interceptor engines described in this paper, can intercept an asset request. In various implementations, an asset request can be intercepted through an engine implemented at the kernel layer of the virtual asset utilization system. In various implementations, an asset request can be intercepted using a file system hook operatively interposed between a file system manager and a file system driver of the virtual asset utilization system.

The flowchart 1300 continues to module 1304, where a stub is implanted to temporarily satisfy the request. Through the use of a stub, the virtual asset utilization system can be tricked into thinking that the portion of the asset resides at the virtual asset utilization system, while the asset is actually virtualized at the virtual asset utilization system. An applicable engine for implanting a stub, such as the stub implantation engines described in this paper, can function to implant the stub at the virtual asset utilization system to temporarily satisfy the request. A specific stub to implant can be selected based on characteristics of the intercepted request. For example, a stub can be selected that is for use with a specific application if the request is made for a portion of the specific application.

The flowchart 1300 continues to module 1306, where the request is mapped to a physical location of a portion of a virtualized asset corresponding to the corresponding portion of the asset. An applicable engine for mapping a request to a portion of a virtualized asset, such as the asset mapping engines described in this paper, can map the request to a physical location of a portion of a virtualized asset corresponding to the portion of the asset. The request can be mapped to a physical location of a portion of a virtualized asset corresponding to the portion of the asset using a resource map. In various implementations, the request is mapped to a physical location of a portion of a virtualized asset corresponding to the portion of the asset using a virtual file map.

The flowchart 1300 continues to decision point 1308, where it is determined whether the physical location is remote. An applicable engine for determining if a physical location of a portion of a virtualized asset is remote, such as the remote paging engines described in this paper, can determine whether the physical location of the portion of the virtualized asset is remote relative to the virtual asset utilization system. Whether the physical location is remote from the virtual asset utilization system can be determined based on the mapping of the request to the physical location.

If it is determined that the physical location is at the virtual asset utilization system, then the flowchart continues to module 1310. At module 1310, the virtual asset utilization system is notified that the portion of the virtualized asset is locally available. An applicable engine for communicating with the virtual asset utilization system, such as the remote paging engines described in this paper, can function to notify the virtual asset utilization system that the portion of the virtualized asset is stored locally. The determination as to whether the physical location is remote from the virtual asset utilization system can be determined at a location remote from the virtual asset utilization system, e.g. in a streaming server. In various implementations, even if the portion of the virtualized asset resides at the virtual asset utilization system, the virtualized asset in its entirety remains absent from the virtual asset utilization system, thereby virtualizing the asset at the virtual asset utilization system.

If it is determined that the physical location is remote from the virtual asset utilization system then the flowchart continues to module 1312, where the portion of the virtualized asset is provided to the virtual asset utilization system to satisfy the request. An applicable engine for communicating with the virtual asset utilization system, such as the remote paging engines described in this paper, can provide the portion of the virtualized asset to the virtual asset utilization system. In providing the portion of the virtualized asset, the portion can be retrieved or copied from the physical location and sent to the virtual asset utilization system. In a specific implementation, certain portions of a virtualized asset are not cached or obtaining a first portion of a virtualized asset causes a second portion of the virtualized asset to be removed from cache (and other local storage); thus, the virtualized asset is at least in part locally absent from the virtual asset utilization system.

Figure 14:
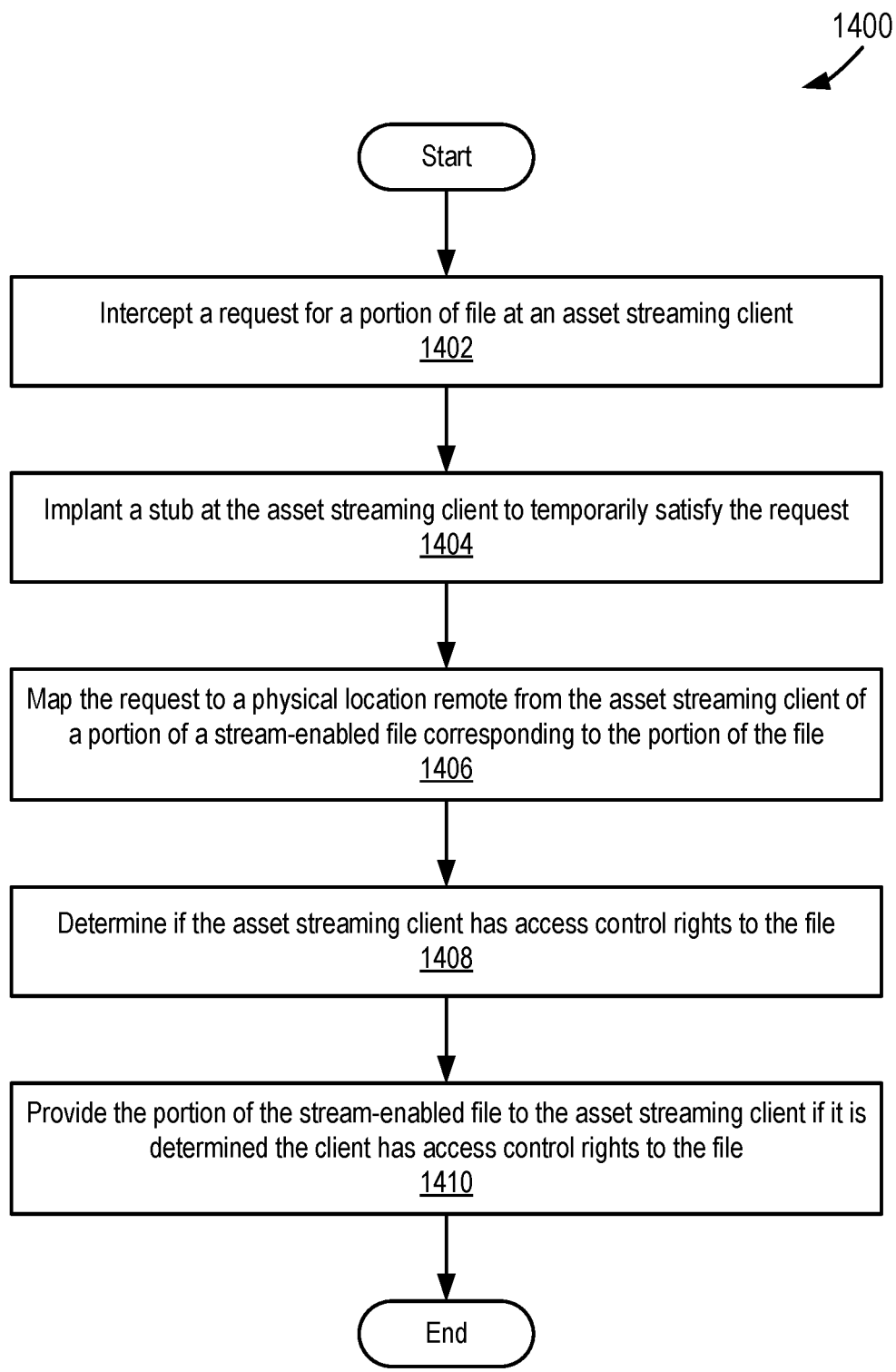
FIG. 14 depicts a flowchart of an example of a method for remote paging a portion of a file based on access control rights.

FIG. 14 depicts a flowchart 1400 of an example of a method for remote paging a portion of a file to the virtual asset utilization system based on access control rights. The flowchart 1400 begins at module 1402, where a request for a portion of a file is intercepted. An applicable engine for intercepting asset requests, such as the asset request interceptor engines described in this paper, can intercept a request for a portion of a file at a virtual asset utilization system. In various implementations, a request for a portion of a file can be intercepted through an engine implemented at the kernel layer of the virtual asset utilization system. In various implementations, a request for a portion of a file can be intercepted using a file system hook operatively interposed between a file system manager and a file system driver of the virtual asset utilization system.

The flowchart 1400 continues to module 1404, where a stub is implanted to temporarily satisfy the request for the portion of the file. Through the use of a stub, a virtual asset utilization system can be tricked into thinking that the portion of file resides at the virtual asset utilization system, while the file is actually not physically present at the virtual asset utilization system. An applicable engine for implanting a stub, such as the stub implantation engines described in this paper, can function to implant the stub at the virtual asset utilization system to temporarily satisfy the request. A specific stub to implant can be selected based on characteristics of the intercepted request. For example, a specific stub can be selected if it for use with a specific file type and the intercepted request is for a portion of a file of the specific file type.

The flowchart 1400 continues to module 1406, where the request is mapped to a physical location of a portion of a virtualized file corresponding to the corresponding portion of the file. An applicable engine for mapping a request to a portion of a virtualized file, such as the asset mapping engines described in this paper, can map the request to a physical location of a portion of a virtualized file corresponding to the portion of the file. The request can be mapped to a physical location of a portion of a virtualized file corresponding to the portion of the file using a resource map. In various implementations, the request is mapped to a physical location of a portion of a virtualized file corresponding to the portion of the file using a virtual file map.

The flowchart 1400 continues to module 1408, where it is determined whether access control rights to the file exist. An applicable engine for determining whether access control rights exist, such as the remote paging engines described in this paper, can determine whether a virtual asset utilization system has access control rights to the file. An instance of the virtual asset utilization system and/or an instance of a user can be utilized to determine whether access control rights exist. For example, an instance can be queried to determine if a user has a license to a file or an asset associated with the file.

The flowchart 1400 continues to module 1410, where the portion of the virtualized file is provided when it is determined access control rights to the file exist. An applicable engine for providing a file or portions of a file, such as the remote paging engines described in this paper, can provide a portion of the virtualized file to a virtual asset utilization system. In providing the portion of the virtualized file, the portion can be retrieved or copied from the physical location at which it resides and sent to the virtual asset utilization system. In various implementations, even once the portion of the virtualized file is provided to the virtual asset utilization system, the virtualized file, in its entirety, remains absent from the virtual asset utilization system, thereby virtualizing the file at the virtual asset utilization system.

Figure 15:
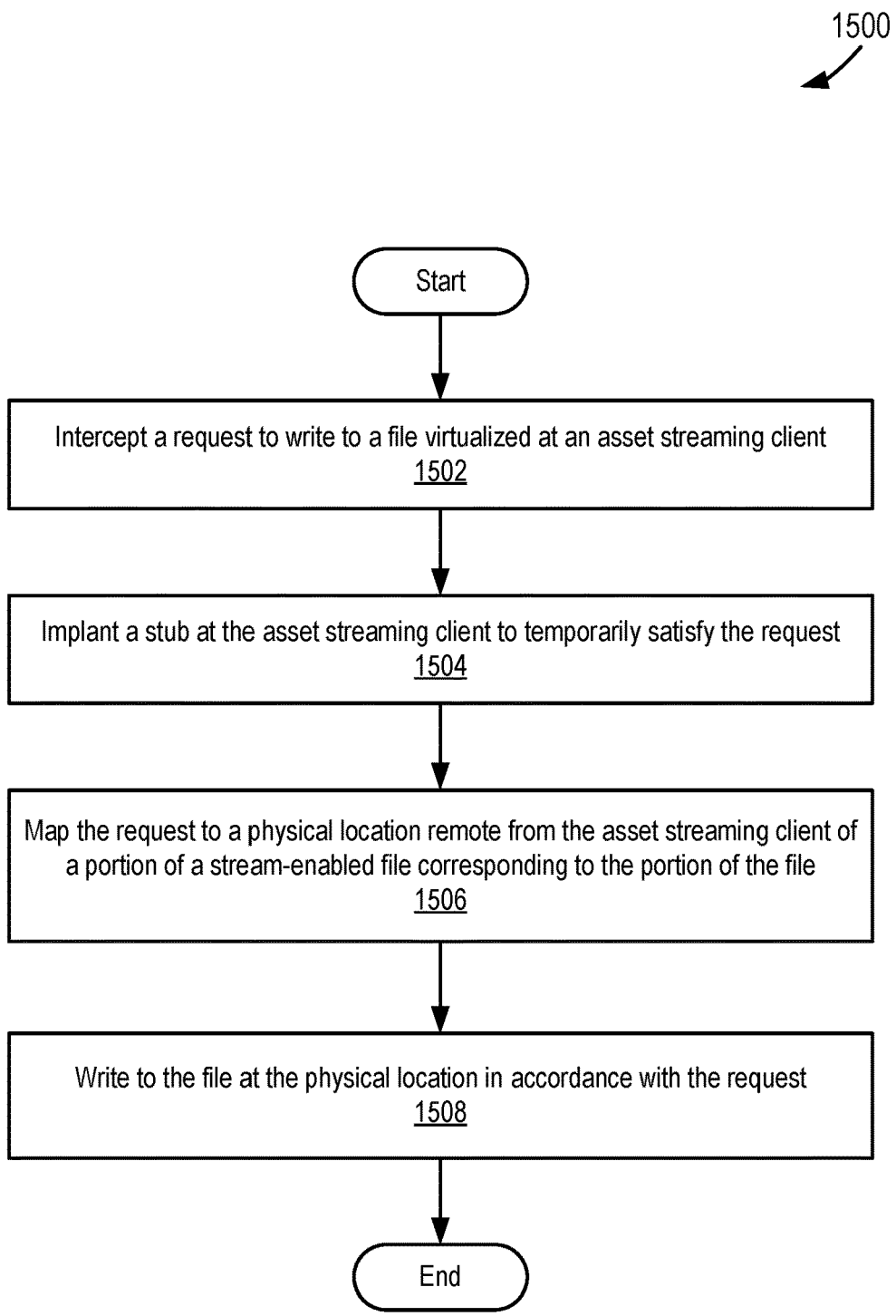
FIG. 15 depicts a flowchart of an example of a method for writing to a file virtualized on the virtual asset utilization system through remote paging.

FIG. 15 depicts a flowchart 1500 of an example of a method for writing to a file virtualized on the virtual asset utilization system through remote paging. The flowchart 1500 begins at module 1502, where a request to write to a file virtualized at the virtual asset utilization system is intercepted. An applicable engine for intercepting asset requests, such as the asset request interceptor engines described in this paper, can intercept to write to a file virtualized at the virtual asset utilization system. In various implementations, a file is virtualized at the virtual asset utilization system in that it does not reside in its entirety at a given time at the virtual asset utilization system. Depending upon implementation-specific or other considerations, a file virtualized at the virtual asset utilization system is stored in a cloud workspace remote from the virtual asset utilization system. In various implementations, a request to write to a file virtualized at the virtual asset utilization system can be intercepted through an engine implemented at the kernel layer of the virtual asset utilization system. In various implementations, a request to write to a file virtualized at the virtual asset utilization system can be intercepted using a file system hook operatively interposed between a file system manager and a file system driver of the virtual asset utilization system.

The flowchart 1500 continues to module 1504, where a stub is implanted at the virtual asset utilization system to temporarily satisfy the request. Through the use of a stub, the virtual asset utilization system can be tricked into thinking that the portion of the asset resides at the virtual asset utilization system, while the asset is actually virtualized at the virtual asset utilization system. An applicable engine for implanting a stub, such as the stub implantation engines described in this paper, can function to implant the stub at the virtual asset utilization system to temporarily satisfy the request. A specific stub to implant can be selected based on characteristics of the intercepted request. For example, a stub can be selected that is for use with a specific application if the request is made for a portion of the specific application.

The flowchart 1500 continues to module 1506, where the request is mapped to a physical location remote from the virtual asset utilization system of a portion of a virtualized file corresponding to the portion of the file. An applicable engine for mapping a request to a portion of a virtualized asset, such as the asset mapping engines described in this paper, can map the request to a physical location of a virtualized file corresponding to the file. The request can be mapped to a physical location of a virtualized file corresponding to the file using a resource map. In various implementations, the request can be mapped to a physical location of a virtualized file corresponding to the file using a virtual file map.

The flowchart 1500 continues to module 1508, where the file is written to at the physical location remote from the virtual asset utilization system in accordance with the request. An applicable engine for writing to a file at a remote location, such as the asset writing engines described in this paper, can write to the file at the physical location remote from the virtual asset utilization system in accordance with the request. In writing to the file according to the request, the file can be written to using data indicating what to write to the file and/or a pointer to a location in the file where the data should be written.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A method comprising:
receiving, at a virtualized asset local provisioning server from a content client, interaction output over a local area network (LAN) generated based on user interaction with rendered content input representing a virtualized asset being exploited;
determining from the interaction output, at the virtualized asset local provisioning server, a first portion of the virtualized asset that is not present at the content client;
determining if the first portion of the virtualized asset resides in local storage at the virtualized asset local provisioning server;
obtaining the first portion of the virtualized asset from a remote virtualized asset delivery system over a wide area network (WAN), wherein the obtaining includes sending a request to the remote virtualized asset delivery system to alter a predetermined serial stream of portions of the virtualized asset to prioritize sending of the first portion of the virtualized asset if it is determined the first portion of the virtualized asset is absent from the local storage;
providing, from the virtualized asset local provisioning server, the first portion of the virtualized asset to the content client;
predicting a second portion of the virtualized asset based on the first portion of the virtualized asset, wherein the predicting is based on what application is running at the virtualized asset local provisioning server at a given time;
sending the second portion of the virtualized asset for generating new interaction output for the content client;
mapping, at the remote virtualized asset delivery system, a second portion of the virtualized asset associated with a second request for the first portion of the virtualized asset to a physical location where the second portion of the virtualized asset resides;

retrieving the second portion of the virtualized asset based on the mapping;
sending, to the virtualized asset local provisioning server over the WAN, the second portion of the virtualized asset based on the mapping;
wherein the second request for the first portion of the virtualized asset is stored in a request history at the remote virtualized asset delivery system, the request history being used to optimize a resource map of the remote virtualized asset delivery system.

2. The method of claim 1, wherein the virtualized asset is a branching virtualized asset.

3. The method of claim 1, wherein the virtualized asset includes an operating system.

4. The method of claim 1, comprising:
determining whether the content client or a user utilizing the content client has rights to access the virtualized asset;
if it is determined the content client or the user utilizing the content client has rights to access the virtualized asset, providing content input for rendering at the content client.

5. The method of claim 1, comprising maintaining a server instance of the virtualized asset local provisioning server for use, at least in part, in exploiting the virtualized asset.

6. The method of claim 1, comprising:
predicting, by the remote virtualized asset delivery system, a second portion of the virtualized asset or another virtualized asset based on the first portion of the virtualized asset;
sending the second portion of the virtualized asset or the other virtualized asset to the virtualized asset local provisioning server.

7. The method of claim 1, comprising:
preventing, in response to the determining the first portion of the virtualized asset is absent from the local storage at the virtualized asset local provisioning server, a first request for the first portion of the virtualized asset from reaching an operating system of the virtualized asset local provisioning server.

8. A system comprising:
one or more processors; and
memory storing instructions that, when executed by the one or more processors, cause the system to perform:
receiving, at a virtualized asset local provisioning server from a content client, interaction output over a local area network (LAN) generated based on user interaction with rendered content input representing a virtualized asset being exploited;
determining from the interaction output, at the virtualized asset local provisioning server, a first portion of the virtualized asset that is not present at the content client;
determining if the first portion of the virtualized asset resides in local storage at the virtualized asset local provisioning server;
obtaining the first portion of the virtualized asset from a remote virtualized asset delivery system over a wide area network (WAN), wherein the obtaining includes sending a request to the remote virtualized asset delivery system to alter a predetermined serial stream of portions of the virtualized asset to prioritize sending of the first portion of the virtualized asset if it is determined the first portion of the virtualized asset is absent from the local storage;
providing, from the virtualized asset local provisioning server, the first portion of the virtualized asset to the content client;
predicting a second portion of the virtualized asset based on the first portion of the virtualized asset, wherein the predicting is based on what application is running at the virtualized asset local provisioning server at a given time;
sending the second portion of the virtualized asset for generating new interaction output for the content client;
mapping a second portion of the virtualized asset associated with a second request for the first portion of the virtualized asset to a physical location where the second portion of the virtualized asset resides;
including a map to a physical location of the second portion of the virtualized asset;
retrieving the second portion of the virtualized asset based on the mapping;
sending, to the virtualized asset local provisioning server over the WAN, the second portion of the virtualized asset based on the mapping;
wherein the second request for the first portion of the virtualized asset is stored in a request history at the remote virtualized asset delivery system, the request history being used to optimize a resource map of the remote virtualized asset delivery system.

9. The system of claim 8, wherein the virtualized asset is a branching virtualized asset.

10. The system of claim 8, wherein the virtualized asset includes an operating system.

11. The system of claim 8, further comprising:
an access engine at the virtualized asset local provisioning server configured to:
determine whether the content client or a user utilizing the content client has rights to access the virtualized asset;
provide content input for rendering at the content client, if it is determined that the content client or the user utilizing the content client has rights to access the virtualized asset.

12. The system of claim 10, further comprising:
a server instance of the virtualized asset local provisioning server, at the remote virtualized asset delivery system, configured to, at least in part, exploit the virtualized asset.

13. The system of claim 10, further comprising:
a virtualized asset portion prediction engine at the remote virtualized asset delivery system, configured to:
predict a second portion of the virtualized asset or another virtualized asset based on the first portion of the virtualized asset;
send the second portion of the virtualized asset or the other virtualized asset to the virtualized asset local provisioning server.

14. The system of claim 10, further comprising:
a virtualized asset portion prediction engine at the remote virtualized asset delivery system, configured to:
predict, using a server instance of the virtualized asset local provisioning server, a second portion of the virtualized asset or another virtualized asset based on the first portion of the virtualized asset;
send the second portion of the virtualized asset or the other virtualized asset to the virtualized asset local provisioning server.

15. A system comprising:

means for receiving, at a virtualized asset local provisioning server from a content client, interaction output over a local area network (LAN) generated based on user interaction with rendered content input representing a virtualized asset being exploited;

means for determining from the interaction output, at the virtualized asset local provisioning server, a first portion of the virtualized asset that is not present at the content client;

means for determining if the first portion of the virtualized asset resides in local storage at the virtualized asset local provisioning server;

means for obtaining the first portion of the virtualized asset from a remote virtualized asset delivery system over a wide area network (WAN), wherein the obtaining includes sending a request to the remote virtualized asset delivery system to alter a predetermined serial stream of portions of the virtualized asset to prioritize sending of the first portion of the virtualized asset if it is determined the first portion of the virtualized asset is absent from the local storage;

means for providing, from the virtualized asset local provisioning server, the first portion of the virtualized asset to the content client;

means for predicting a second portion of the virtualized asset based on the first portion of the virtualized asset, wherein the predicting is based on what application is running at the virtualized asset local provisioning server at a given time;

means for sending the second portion of the virtualized asset for generating new interaction output for the content client;

means for mapping, at the remote virtualized asset delivery system, a second portion of the virtualized asset associated with a second request for the first portion of the virtualized asset to a physical location where the second portion of the virtualized asset resides;

means for retrieving the second portion of the virtualized asset based on the mapping;

means for sending, to the virtualized asset local provisioning server over the WAN, the second portion of the virtualized asset based on the mapping;

wherein the second request for the first portion of the virtualized asset is stored in a request history at the remote virtualized asset delivery system, the request history being used to optimize a resource map of the remote virtualized asset delivery system.

16. The system of claim 15, further comprising:

means for preventing, in response to the determining the first portion of the virtualized asset is absent from the local storage at the virtualized asset local provisioning server, a first request for the first portion of the virtualized asset from reaching an operating system of the virtualized asset local provisioning server.

* * * * *